(12) United States Patent
Li et al.

(10) Patent No.: US 9,788,353 B2
(45) Date of Patent: Oct. 10, 2017

(54) MOBILE NETWORK COMMUNICATIONS METHOD, COMMUNICATIONS APPARATUS, AND COMMUNICATIONS SYSTEM

(71) Applicant: Huawei Technologies Co., Ltd., Shenzhen, Guangdong (CN)

(72) Inventors: Yan Li, Beijing (CN); Jin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 96 days.

(21) Appl. No.: 14/723,281

(22) Filed: May 27, 2015

(65) Prior Publication Data

US 2015/0257182 A1    Sep. 10, 2015

Related U.S. Application Data

(63) Continuation of application No. PCT/CN2012/085483, filed on Nov. 28, 2012.

(51) Int. Cl.
| | |
|---|---|
| *H04W 76/02* | (2009.01) |
| *H04W 48/18* | (2009.01) |
| *H04M 15/00* | (2006.01) |
| *H04W 88/16* | (2009.01) |
| *H04W 8/08* | (2009.01) |

(Continued)

(52) U.S. Cl.
CPC ......... *H04W 76/022* (2013.01); *H04M 15/66* (2013.01); *H04M 15/8214* (2013.01); *H04W 48/18* (2013.01); *H04W 88/16* (2013.01); *H04L 12/1407* (2013.01); *H04L 43/028* (2013.01); *H04W 8/082* (2013.01)

(58) Field of Classification Search
None
See application file for complete search history.

(56) References Cited

U.S. PATENT DOCUMENTS

| | | | |
|---|---|---|---|
| 2003/0048783 A1* | 3/2003 | Tateoka | H04L 63/1408 370/390 |
| 2004/0213272 A1* | 10/2004 | Nishi | H04L 29/12009 370/401 |

(Continued)

FOREIGN PATENT DOCUMENTS

| | | |
|---|---|---|
| CN | 101836468 A | 9/2010 |
| CN | 102143559 A | 8/2011 |

*Primary Examiner* — Jenee Williams

(57) ABSTRACT

Embodiments of the present invention provide a mobile network communications method, communications apparatus, and communications system. The method includes: receiving, by a transport packet data network gateway, a data packet to be sent to a mobile node, and determining a home packet data network gateway of the mobile node according to IP address information of the mobile node; then sending a data connection establishment request message to the home packet data network gateway, to request to establish a data connection to a base station or a serving gateway at a location of the mobile node; and finally sending the data packet to the base station or the serving gateway through a channel of the data connection, or receiving a data packet that is sent by the base station or the serving gateway through a channel of the data connection.

20 Claims, 11 Drawing Sheets

(51) Int. Cl.
*H04L 12/26* (2006.01)
*H04L 12/14* (2006.01)

(56) References Cited

U.S. PATENT DOCUMENTS

| | | | |
|---|---|---|---|
| 2005/0185658 A1* | 8/2005 | Kamiwada | H04L 12/2803 370/401 |
| 2008/0130627 A1* | 6/2008 | Chen | H04L 45/02 370/351 |
| 2008/0183889 A1* | 7/2008 | Andreev | H04L 29/06 709/238 |
| 2009/0129290 A1* | 5/2009 | Seo | H04L 49/602 370/254 |
| 2009/0201852 A1 | 8/2009 | Chen | |
| 2010/0177674 A1 | 7/2010 | Aggarwal | |
| 2011/0013637 A1* | 1/2011 | Xue | H04L 12/4679 370/395.5 |
| 2011/0219126 A1 | 9/2011 | Aramoto | |
| 2012/0044949 A1 | 2/2012 | Velev et al. | |
| 2012/0079113 A1* | 3/2012 | Zhu | H04L 63/0272 709/225 |
| 2014/0071884 A1* | 3/2014 | Sherman | H04W 4/22 370/315 |
| 2014/0133396 A1* | 5/2014 | Liu | H04L 45/42 370/328 |

\* cited by examiner

MOBILE NETWORK COMMUNICATIONS METHOD, COMMUNICATIONS APPARATUS, AND COMMUNICATIONS SYSTEM

CROSS-REFERENCE TO RELATED APPLICATIONS

This application is a continuation of International Application No. PCT/CN2012/085483, filed on Nov. 28, 2012, which is hereby incorporated by reference in its entirety.

TECHNICAL FIELD

The present invention relates to the communications field, and in particular, to a mobile network communications method, communications apparatus, and communications system.

BACKGROUND

Over the past decades, rapid development of mobile communications networks has brought more and more convenience to people's life.

The following describes a communication process in the prior art by using FIG. 1 as an example. When a correspondent node CN (Correspondent Node) communicates with a mobile node MN (Mobility Node) through a mobile communications network, a data packet is sent from the correspondent node, routed to a packet data network gateway PGW (Packet Data Network Gateway, that is, PDN Gateway) of the MN through a network (Internet), and transferred by the PGW to a serving gateway SGW (Serving Gateway) at a current location of the MN, and then the serving gateway SGW sends the data packet to the MN by using a base station. When the MN returns a data packet, the data packet must also pass through the SGW and the PGW, and be routed to the CN through the Internet. The PGW is a home packet data network gateway of the MN.

In this case, as shown in FIG. 1, all communication data of the MN needs to be forwarded by the PGW of the MN. Even though the MN and the CN are in close proximity and are within a coverage range of a same serving gateway SGW, communication between the two terminals still needs to be routed to the PGW of the MN, which leads to roundabout communication routing between the MN and the CN to some extent.

Further, deployment density of mobile gateways increasingly rises with development of mobile broadband networks. Meanwhile, the scope of people's life is continuously extended, and users often move to coverage ranges of mobile gateways of other non-home packet data network gateways in daily life. This exacerbates the problem of roundabout communication routing of a mobile node, and further causes a severe waste of transmission resources of a mobile communications system and higher end-to-end latency of the mobile node.

SUMMARY

Embodiments of the present invention provide a mobile network communications method, communications apparatus, and communications system, which can solve a problem of roundabout routing of a mobile communications network, and further saves a transmission resource of a mobile communications system and lowers end-to-end latency of a mobile node.

To achieve the foregoing objectives, the following technical solutions are used in the embodiments of the present invention:

According to a first aspect, a mobile network communications method is provided, where the method includes:

receiving a data packet to be sent to a mobile node, where the data packet carries IP address information of the mobile node;

determining a home packet data network gateway of the mobile node according to the IP address information of the mobile node;

sending a data connection establishment request message to the home packet data network gateway, to request to establish a data connection to a base station or a serving gateway at a location of the mobile node, so that a transport packet data network gateway establishes the data connection to the base station or the serving gateway by using the home packet data network gateway, where the transport packet data network gateway stores information about all IP address segments in an entire mobile network that are used for being assigned to a mobile node, and the transport packet data network gateway notifies all nearby network nodes of the information about all IP address segments that are used for being assigned to a mobile node, so that a correspondent node can access the mobile network by using the transport packet data network gateway; and sending the data packet to the base station or the serving gateway through a channel of the data connection, or receiving a data packet that is sent by the base station or the serving gateway through a channel of the data connection.

With reference to the first aspect, in a first possible implementation manner, the determining a home packet data network gateway of the mobile node according to the IP address information of the mobile node specifically includes:

querying a specific network element according to the IP address information of the mobile node, so as to determine the home packet data network gateway of the mobile node; or querying a pre-configured mapping relationship between an IP address segment and the home packet data network gateway according to an IP address of the mobile node, so as to determine the home packet data network gateway of the mobile node.

With reference to the first aspect or the first possible implementation manner, in a second possible implementation manner, the sending a data connection establishment request message to the home packet data network gateway is specifically:

sending a dedicated bearer setup request message to the home packet data network gateway, to request to set up a dedicated bearer to the base station or the serving gateway at the location of the mobile node, where the dedicated bearer setup request message carries an IP address of the transport packet data network gateway and a tunnel endpoint identifier TEID assigned by the transport packet data network gateway, so that the dedicated bearer is set up between the transport packet data network gateway and the serving gateway or the base station according to the IP address and the TEID.

With reference to the first aspect or the first possible implementation manner or the second possible implementation manner, in a third possible implementation manner, the home packet data network gateway is specifically a control plane network element of the home packet data network gateway.

With reference to the first aspect or the first possible implementation manner to the third possible implementation manner, in a fourth possible implementation manner, before the sending the data packet to the base station or the serving gateway through a channel of the data connection, or receiving a data packet that is sent by the base station or the serving gateway through a channel of the data connection, the method further includes:

receiving a first charging indication message sent by the home packet data network gateway, where the first charging indication message is used for requesting the transport packet data network gateway to send charging information of the data packet to the home packet data network gateway; and after the sending the data packet to the base station or the serving gateway through a channel of the data connection, or receiving a data packet that is sent by the base station or the serving gateway through a channel of the data connection, the method further includes:

sending the charging information of the data packet to the home packet data network gateway, so that the home packet data network gateway performs data exchange with a charging center according to a charging policy, so as to complete charging for the data packet.

With reference to the first aspect or the first possible implementation manner to the third possible implementation manner, in a fifth possible implementation manner, before the sending the data packet to the base station or the serving gateway through a channel of the data connection, or receiving a data packet that is sent by the base station or the serving gateway through a channel of the data connection, the method further includes:

receiving a second charging indication message sent by the home packet data network gateway, where the second charging indication message is used for instructing the transport packet data network gateway to charge for the data packet; and after the sending the data packet to the base station or the serving gateway through a channel of the data connection, or receiving a data packet that is sent by the base station or the serving gateway through a channel of the data connection, the method further includes:

performing data exchange with a charging center according to a charging policy, so as to complete charging for the data packet.

With reference to the first aspect or the first possible implementation manner to the fifth possible implementation manner, in a sixth possible implementation manner, before the sending the data packet to the base station or the serving gateway through a channel of the data connection, or after the receiving a data packet that is sent by the base station or the serving gateway through a channel of the data connection, the method further includes:

receiving a first deep packet inspection DPI request message sent by the home packet data network gateway, where the first DPI request message is used for requesting the transport packet data network gateway to perform DPI inspection on the data packet; and performing DPI inspection on the data packet according to the first DPI request message and a pre-configured DPI policy;

or before the sending the data packet to the base station or the serving gateway through a channel of the data connection, or after the receiving a data packet that is sent by the base station or the serving gateway through a channel of the data connection, the method further includes:

receiving a second DPI request message sent by the home packet data network gateway, where the second DPI request message is used for requesting the transport packet data network gateway to send the data packet that meets a condition to the home packet data network gateway for DPI inspection, and the second DPI request message further carries a condition for screening the data packet that meets a condition; and sending the data packet that meets a condition to the home packet data network gateway according to the second DPI request message, so that the home packet data network gateway performs DPI inspection on the data packet according to a DPI policy, and sends an inspection result to the transport packet data network gateway when requested by the transport packet data network gateway;

or before the sending the data packet to the base station or the serving gateway through a channel of the data connection, or after the receiving a data packet that is sent by the base station or the serving gateway through a channel of the data connection, the method further includes:

receiving a third DPI request message sent by the home packet data network gateway, where the third DPI request message is used for instructing the transport packet data network gateway to send the data packet to an external DPI module for inspection, where the external DPI module is specified by the home packet data network gateway; and sending the data packet to the external DPI module specified by the home packet data network gateway, so that the external DPI module specified by the home packet data network gateway performs DPI inspection on the data packet, and feeds back an inspection result to the transport packet data network gateway when requested by the transport packet data network gateway.

According to a second aspect, a mobile network communications method is provided, where the method includes:

receiving a data connection establishment request message sent by a transport packet data network gateway, where the data connection establishment request message requests to establish a data connection between the transport packet data network gateway and a base station or a serving gateway at a location of a mobile node, and the data connection request message is a message that is sent by the transport packet data network gateway to a home packet data network gateway of the mobile node after the transport packet data network gateway receives a data packet to be sent to the mobile node and determines the home packet data network gateway according to IP address information of the mobile node carried in the data packet; and establishing the data connection between the transport packet data network gateway and the base station or the serving gateway, so that the transport packet data network gateway sends the data packet to the base station or the serving gateway through a channel of the data connection, or receives a data packet that is sent by the base station or the serving gateway through a channel of the data connection, and so that the base station or the serving gateway stores information about an uplink path and a downlink path for communication performed through the channel of the data connection.

With reference to the second aspect, in a first possible implementation manner, the establishing the data connection between the transport packet data network gateway and the base station specifically includes:

sending a first data connection establishment request message to the base station, to request the base station to establish the data connection to the transport packet data network gateway; and receiving a first data connection establishment response message sent by the base station, and sending the first data connection establishment response message to the transport packet data network gateway;

or the establishing the data connection between the transport packet data network gateway and the base station specifically includes:

sending a second data connection establishment request message for requesting the base station to establish the data connection to the transport packet data network gateway, to the serving gateway, so that the serving gateway sends the second data connection establishment request message to the base station by using a mobility management entity; and receiving a second data connection establishment response message that is sent by the base station by using the mobility management entity and the serving gateway, and sending the second data connection establishment response message to the transport packet data network gateway;

or the establishing the data connection between the transport packet data network gateway and the serving gateway specifically includes:

sending a third data connection establishment request message to the serving gateway, to request the serving gateway to establish the data connection to the transport packet data network gateway; and receiving a third data connection establishment response message sent by the serving gateway, and sending the third data connection response message to the transport packet data network gateway.

With reference to the second aspect, in a second possible implementation manner, the data connection establishment request message is a dedicated bearer setup request message, where the dedicated bearer setup request message carries an IP address of the transport packet data network gateway and a tunnel endpoint identifier TEID assigned by the transport packet data network gateway; and the establishing the data connection between the transport packet data network gateway and the base station specifically includes:

setting up a first dedicated bearer between the transport packet data network gateway and the base station according to the IP address of the transport packet data network gateway and the assigned TEID;

or the establishing the data connection between the transport packet data network gateway and the serving gateway is specifically:

setting up a second dedicated bearer between the transport packet data network gateway and the serving gateway according to the IP address of the transport packet data network gateway and the assigned TEID.

With reference to the second aspect or the first possible implementation manner or the second possible implementation manner, in a third possible implementation manner, before the sending, by the transport packet data network gateway, the data packet to the base station or the serving gateway through a channel of the data connection, or receiving a data packet that is sent by the base station or the serving gateway through a channel of the data connection, the method further includes:

sending a first charging indication message to the transport packet data network gateway, where the first charging indication message is used for requesting the transport packet data network gateway to send charging information of the data packet to the home packet data network gateway; and after the sending, by the transport packet data network gateway, the data packet to the base station or the serving gateway through a channel of the data connection, or receiving a data packet that is sent by the base station or the serving gateway through a channel of the data connection, the method further includes:

receiving the charging information, sent by the transport packet data network gateway, of the data packet; and performing data exchange with a charging center according to the charging information and a charging policy, so as to complete charging for the data packet.

With reference to the second aspect or the first possible implementation manner or the second possible implementation manner, in a fourth possible implementation manner, before the sending, by the transport packet data network gateway, the data packet to the base station or the serving gateway through a channel of the data connection, or receiving a data packet that is sent by the base station or the serving gateway through a channel of the data connection, the method further includes:

sending a second charging indication message to the transport packet data network gateway, where the second charging indication message is used for instructing the transport packet data network gateway to charge for the data packet, so that after sending the data packet to the base station or the serving gateway through the channel of the data connection, or receiving the data packet that is sent by the base station or the serving gateway through the channel of the data connection, the transport packet data network gateway performs data exchange with a charging center according to a charging policy, so as to complete charging for the data packet.

With reference to the second aspect or the first possible implementation manner to the fourth possible implementation manner, in a fifth possible implementation manner, before the sending, by the transport packet data network gateway, the data packet to the base station or the serving gateway through a channel of the data connection, or after the receiving a data packet that is sent by the base station or the serving gateway through a channel of the data connection, the method further includes:

sending a first deep packet inspection DPI request message to the transport packet data network gateway, where the first DPI request message is used for requesting the transport packet data network gateway to perform DPI inspection on the data packet, so that the transport packet data network gateway performs DPI inspection on the data packet according to the first DPI request message and a pre-configured DPI policy;

or before the sending, by the transport packet data network gateway, the data packet to the base station or the serving gateway through a channel of the data connection, or after the receiving a data packet that is sent by the base station or the serving gateway through a channel of the data connection, the method further includes:

sending a second DPI request message to the transport packet data network gateway, where the second DPI request message is used for requesting the transport packet data network gateway to send the data packet that meets a condition to the home packet data network gateway for DPI inspection, and the second DPI request message further carries a condition for screening the data packet that meets a condition; and receiving the data packet sent by the transport packet data network gateway and performing DPI inspection on the data packet, and sending an inspection result to the transport packet data network gateway upon a request by the transport packet data network gateway;

or before the sending, by the transport packet data network gateway, the data packet to the base station or the serving gateway through a channel of the data connection, or after the receiving a data packet that is sent by the base station or the serving gateway through a channel of the data connection, the method further includes:

sending a third DPI request message to the transport packet data network gateway, where the third DPI request message is used for instructing the transport packet data network gateway to send the data packet to an external DPI module for inspection, where the external DPI module is specified by the home packet data network gateway, so that the transport packet data network gateway sends the data packet to the external DPI module specified by the home packet data network gateway, and so that the external DPI module specified by the home packet data network gateway performs DPI inspection on the data packet, and sends an inspection result to the transport packet data network gateway when requested by the transport packet data network gateway.

According to a third aspect, a transport packet data network gateway is provided, where the transport packet data network gateway includes a receiver, a processor, and a sender, where the receiver is configured to receive a data packet to be sent to a mobile node, and send the data packet to the processor, where the data packet carries IP address information of the mobile node;

the processor is configured to receive the data packet that is sent by the receiver and carries the IP address information of the mobile node, determine a home packet data network gateway of the mobile node according to the IP address information of the mobile node, and then send IP address information of the home packet data network gateway to the sender;

the sender is configured to receive the IP address information of the home packet data network gateway of the mobile node that is sent by the processor, and send a data connection establishment request message to the home packet data network gateway determined by the processor, to request to establish a data connection to a base station or a serving gateway at a location of the mobile node, so that the transport packet data network gateway establishes the data connection to the base station or the serving gateway by using the home packet data network gateway, where the transport packet data network gateway stores information about all IP address segments in an entire mobile network that are used for being assigned to a mobile node, and the transport packet data network gateway notifies all nearby network nodes of the information about all IP address segments that are used for being assigned to a mobile node, so that a correspondent node can access the mobile network by using the transport packet data network gateway;

the sender is further configured to send the data packet to the base station or the serving gateway through a channel of the data connection; and the receiver is further configured to receive a data packet that is sent by the base station or the serving gateway through a channel of the data connection.

With reference to the third aspect, in a first possible implementation manner, the determining, by the processor, a home packet data network gateway of the mobile node according to the IP address information of the mobile node specifically includes:

querying a specific network element according to the IP address information of the mobile node, so as to determine the home packet data network gateway of the mobile node;

or querying a pre-configured mapping relationship between an IP address segment and the home packet data network gateway according to an IP address of the mobile node, so as to determine the home packet data network gateway of the mobile node.

With reference to the third aspect or the first possible implementation manner, in a second possible implementation manner, the sending, by the sender, a data connection establishment request message to the home packet data network gateway is specifically:

sending a dedicated bearer setup request message to the home packet data network gateway, to request to set up a dedicated bearer to the base station or the serving gateway at the location of the mobile node, where the dedicated bearer setup request message carries an IP address of the transport packet data network gateway and a tunnel endpoint identifier TEID assigned by the transport packet data network gateway, so that the dedicated bearer is set up between the transport packet data network gateway and the serving gateway or the base station according to the IP address and the TEID.

With reference to the third aspect or the first possible implementation manner or the second possible implementation manner, in a third possible implementation manner, the home packet data network gateway is specifically a control plane network element of the home packet data network gateway.

With reference to the third aspect or the first possible implementation manner to the third possible implementation manner, in a fourth possible implementation manner, the receiver is further configured to: before the data packet is sent to the base station or the serving gateway through the channel of the data connection, or the data packet that is sent by the base station or the serving gateway through the channel of the data connection is received, receive a first charging indication message sent by the home packet data network gateway, and send the first charging indication message to the sender, where the first charging indication message is used for requesting the transport packet data network gateway to send charging information of the data packet to the home packet data network gateway; and the sender is further configured to: receive the first charging indication message sent by the receiver, and after the data packet is sent to the base station or the serving gateway through the channel of the data connection, or the data packet that is sent by the base station or the serving gateway through the channel of the data connection is received, send the charging information of the data packet to the home packet data network gateway, so that the home packet data network gateway performs data exchange with a charging center according to a charging policy, so as to complete charging for the data packet.

With reference to the third aspect or the first possible implementation manner to the third possible implementation manner, in a fifth possible implementation manner, the receiver is further configured to: before the data packet is sent to the base station or the serving gateway through the channel of the data connection, or the data packet that is sent by the base station or the serving gateway through the channel of the data connection is received, receive a second charging indication message sent by the home packet data network gateway, and send the second charging indication message to the processor, where the second charging indication message is used for requesting the transport packet data network gateway to charge for the data packet; and the processor is further configured to: after the data packet is sent to the base station or the serving gateway through the channel of the data connection, or the data packet that is sent by the base station or the serving gateway through the channel of the data connection is received, receive the second charging indication message sent by the receiver, and perform data exchange with a charging center according to a charging policy, so as to complete charging for the data packet.

With reference to the third aspect or the first possible implementation manner to the fifth possible implementation manner, in a sixth possible implementation manner, the receiver is further configured to: before the data packet is sent to the base station or the serving gateway through the channel of the data connection, or after the data packet that is sent by the base station or the serving gateway through the channel of the data connection is received, receive a first deep packet inspection DPI request message sent by the home packet data network gateway, and send the first DPI request message to the processor, where the first DPI request message is used for requesting the transport packet data network gateway to perform DPI inspection on the data packet; and the processor is further configured to receive the first DPI request message sent by the receiver, and perform DPI inspection on the data packet according to the first DPI request message and a pre-configured DPI policy;

or the receiver is further configured to: before the data packet is sent to the base station or the serving gateway through the channel of the data connection, or after the data packet that is sent by the base station or the serving gateway through the channel of the data connection is received, receive a second DPI request message sent by the home packet data network gateway, and send the second DPI request message to the sender, where the second DPI request message is used for requesting the transport packet data network gateway to send the data packet that meets a condition to the home packet data network gateway for DPI inspection, and the second DPI request message further carries a condition for screening the data packet that meets a condition; and the sender is further configured to receive the second DPI request message sent by the receiver, and send the data packet that meets a condition to the home packet data network gateway according to the second DPI message, so that the home packet data network gateway performs DPI inspection on the data packet according to a DPI policy, and sends an inspection result to the transport packet data network gateway when requested by the transport packet data network gateway;

or the receiver is further configured to: before the data packet is sent to the base station or the serving gateway through the channel of the data connection, or after the data packet that is sent by the base station or the serving gateway through the channel of the data connection is received, receive a third DPI request message sent by the home packet data network gateway, and send the third DPI request message to the sender, where the third DPI request message is used for instructing the transport packet data network gateway to send the data packet to an external DPI module for inspection, where the external DPI module is specified by the home packet data network gateway; and the sender is further configured to receive the third DPI request message sent by the receiver, and send, according to the third DPI request message, the data packet to the external DPI module specified by the home packet data network gateway, so that the external DPI module specified by the home packet data network gateway performs DPI inspection on the data packet, and sends an inspection result to the transport packet data network gateway when requested by the transport packet data network gateway.

According to a fourth aspect, a home packet data network gateway is provided, where the home packet data network gateway includes: a receiver and a processor, where the receiver is configured to receive a data connection establishment request message sent by a transport packet data network gateway, and send the data connection establishment request message to the processor, where the data connection establishment request message requests to establish a data connection between the transport packet data network gateway and a base station or a serving gateway at a location of a mobile node, and the data connection request message is a message that is sent by the transport packet data network gateway to a home packet data network gateway of the mobile node after the transport packet data network gateway receives a data packet to be sent to the mobile node and determines the home packet data network gateway according to IP address information of the mobile node carried in the data packet; and the processor is configured to receive the data connection establishment request message sent by the receiver, and establish the data connection between the transport packet data network gateway and the base station or the serving gateway, so that the transport packet data network gateway sends the data packet to the base station or the serving gateway through a channel of the data connection, or receives a data packet that is sent by the base station or the serving gateway through a channel of the data connection, and so that the base station sends the data packet to the mobile node or the serving gateway sends the data packet to the mobile node by using the base station, where the base station or the serving gateway stores information about an uplink path and a downlink path for communication performed through the data connection.

With reference to the fourth aspect, in a first possible implementation manner, the establishing, by the processor, the data connection between the transport packet data network gateway and the base station specifically includes:

sending a first data connection establishment request message to the base station, to request the base station to establish the data connection to the transport packet data network gateway; and receiving a first data connection establishment response message sent by the base station, and sending the first IP connection response message to the transport packet data network gateway;

or the establishing, by the processor, the data connection between the transport packet data network gateway and the base station specifically includes:

sending a second data connection establishment request message for requesting the base station to establish the data connection to the transport packet data network gateway, to the serving gateway, so that the serving gateway sends the second data connection establishment request message to the base station by using a mobility management entity;

receiving a second data connection establishment response message that is sent by the base station by using the mobility management entity and the serving gateway; and sending the second data connection establishment response message to the transport packet data network gateway;

or the establishing, by the processor, the data connection between the transport packet data network gateway and the serving gateway specifically includes:

sending a third data connection establishment request message to the serving gateway, to request the serving gateway to establish the data connection to the transport packet data network gateway; and receiving a third data connection establishment response message sent by the serving gateway, and sending the third data connection response message to the transport packet data network gateway.

With reference to the fourth aspect, in a second possible implementation manner, the data connection establishment request message is a dedicated bearer setup request message, where the dedicated bearer setup request message carries an IP address of the transport packet data network gateway and a tunnel endpoint identifier TEID assigned by the transport packet data network gateway; and the establishing, by the processor, the data connection between the transport packet data network gateway and the base station specifically includes:

the processor is configured to set up a first dedicated bearer between the transport packet data network gateway and the base station according to the IP address of the transport packet data network gateway and the assigned TEID;

or the establishing, by the processor, the data connection between the transport packet data network gateway and the serving gateway specifically includes:

the processor is further configured to set up a second dedicated bearer between the transport packet data network gateway and the serving gateway according to the IP address of the transport packet data network gateway and the assigned TEID.

With reference to the fourth aspect or the first possible implementation manner or the second possible implementation manner, in a third possible implementation manner, the home packet data network gateway further includes a sender, where the sender is configured to: before the transport packet data network gateway sends the data packet to the base station or the serving gateway through the channel of the data connection, or receives the data packet that is sent by the base station or the serving gateway through the channel of the data connection, send a first charging indication message to the transport packet data network gateway, where the first charging indication message is used for requesting the transport packet data network gateway to send charging information of the data packet to the home packet data network gateway;

the receiver is further configured to: after the transport packet data network gateway sends the data packet to the base station or the serving gateway through the channel of the data connection, or receives the data packet that is sent by the base station or the serving gateway through the channel of the data connection, receive the charging information, sent by the transport packet data network gateway, of the data packet, and send the charging information of the data packet to the processor; and the processor is further configured to receive the charging information, sent by the receiver, of the data packet, and perform exchange with a charging center according to the charging information and a charging policy, so as to complete charging for the data packet.

With reference to the fourth aspect or the first possible implementation manner or the second possible implementation manner, in a fourth possible implementation manner, the sender is further configured to: before the transport packet data network gateway sends the data packet to the base station or the serving gateway through the channel of the data connection, or receives the data packet that is sent by the base station or the serving gateway through the channel of the data connection, send a second charging indication message to the transport packet data network gateway, where the second charging indication message is used for instructing the transport packet data network gateway to charge for the data packet, so that after sending the data packet to the base station or the serving gateway through the channel of the data connection, or receiving the data packet that is sent by the base station or the serving gateway through the channel of the data connection, the transport packet data network gateway performs data exchange with a charging center according to a charging policy, so as to complete charging for the data packet.

With reference to the fourth aspect or the first possible implementation manner to the fourth possible implementation manner, in a fifth possible implementation manner, the sender is further configured to: before the transport packet data network gateway sends the data packet to the base station or the serving gateway through the channel of the data connection, or after the transport packet data network gateway receives the data packet that is sent by the base station or the serving gateway through the channel of the data connection, send a first deep packet inspection DPI request message to the transport packet data network gateway, where the first DPI request message is used for requesting the transport packet data network gateway to perform DPI inspection on the data packet, so that the transport packet data network gateway performs DPI inspection on the data packet according to the DPI request message and a pre-configured DPI policy;

or the sender is further configured to: before the transport packet data network gateway sends the data packet to the base station or the serving gateway through the channel of the data connection, or after the transport packet data network gateway receives the data packet that is sent by the base station or the serving gateway through the channel of the data connection, send a second DPI request message to the transport packet data network gateway, where the second DPI request message is used for requesting the transport packet data network gateway to send the data packet that meets a condition to the receiver, and the second DPI request message further carries a condition for screening the data packet that meets a condition;

the receiver is further configured to receive the data packet that is sent by the transport packet data network gateway and meets a condition, and send the data packet to the processor; and the processor is further configured to receive the data packet sent by the receiver and perform, according to a DPI policy, DPI inspection on the data packet that meets a condition, and send an inspection result to the transport packet data network gateway by using the sender when requested by the transport packet data network gateway; or the sender is further configured to: before the transport packet data network gateway sends the data packet to the base station or the serving gateway through the channel of the data connection, or after the transport packet data network gateway receives the data packet that is sent by the base station or the serving gateway through the channel of the data connection, send a third DPI request message to the transport packet data network gateway, where the third DPI request message is used for instructing the transport packet data network gateway to send the data packet to an external DPI module for inspection, where the external DPI module is specified by the home packet data network gateway, so that the transport packet data network gateway sends the data packet to the external DPI module specified by the home packet data network gateway, and so that the external DPI module specified by the home packet data network gateway performs DPI inspection on the data packet, and sends an inspection result to the transport packet data network gateway when requested by the transport packet data network gateway.

According to a fifth aspect, a mobile network communications system is provided, where the system includes a mobile node, a serving gateway, a mobility management entity, and a base station at a location of the mobile node, a home packet data network gateway of the mobile node, and a transport packet data network gateway, where the transport packet data network gateway stores information about all IP address segments in an entire mobile network that are used for being assigned to a mobile node, and the transport packet data network gateway notifies all nearby network nodes of the information about all IP address segments that are used for being assigned to a mobile node, so that a correspondent node can access the mobile network by using the transport packet data network gateway;

the transport packet data network gateway is configured to: receive a data packet to be sent to the mobile node, and determine the home packet data network gateway of the mobile node according to IP address information of the mobile node carried in the data packet; and then send a data connection establishment request message to the home packet data network gateway, to request to establish a data connection to the base station or the serving gateway;

the home packet data network gateway is configured to receive the data connection establishment request message sent by the transport packet data network gateway, and establish the data connection between the transport packet data network gateway and the base station or the serving gateway;

the transport packet data network gateway is further configured to send the data packet to the base station or the serving gateway through a channel of the data connection, or receive a data packet that is sent by the base station or the serving gateway through a channel of the data connection; and after the data connection is established, the base station or the serving gateway stores information about an uplink path and a downlink path for communication performed through the channel of the data connection.

The embodiments of the present invention provide a mobile network communications method, communications apparatus, and communications system. In the method, a transport packet data network gateway stores information about all IP address segments in an entire mobile network that are used for being assigned to a mobile node, and the transport packet data network gateway notifies all nearby network nodes of the information about all IP address segments that are used for being assigned to a mobile node, so that a correspondent node can access the mobile network by using the transport packet data network gateway; after receiving a data packet to be sent to a mobile node, the transport packet data network gateway determines a home packet data network gateway of the mobile node according to IP address information of the mobile node carried in the data packet, and then sends a data connection establishment request message to the home packet data network gateway, to request to establish a data connection between the transport packet data network gateway and a base station or a serving gateway at a location of the mobile node; and after the data connection is established, the transport packet data network gateway sends the data packet to the base station or the serving gateway through a channel of the data connection, or receives a data packet that is sent by the base station or the serving gateway through a channel of the data connection.

Based on the description of the solutions, when a mobile node communicates with a correspondent node, a data connection is established between a transport packet data network gateway and a base station or a serving gateway at a location of the mobile node, which can effectively alleviate roundabout routing. Especially when the mobile node moves to a coverage range of a non-home packet data network gateway, the mobile node communicates with the correspondent node by establishing the data connection, without taking a roundabout way to a home packet data network gateway of the mobile node for receiving and sending a data packet, which further alleviates roundabout communication routing of the mobile node to a large extent; in addition, because the roundabout routing problem is solved, a transmission resource of a mobile communications system is further saved and end-to-end latency of the mobile node is lowered.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
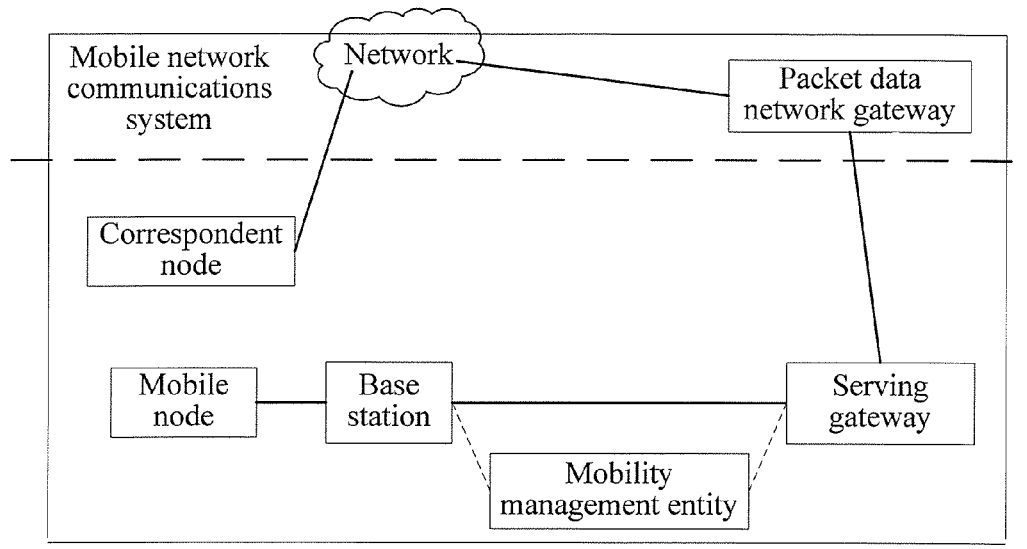
FIG. 1 is a schematic diagram of a mobile network communications process in the prior art.
Figure 2:
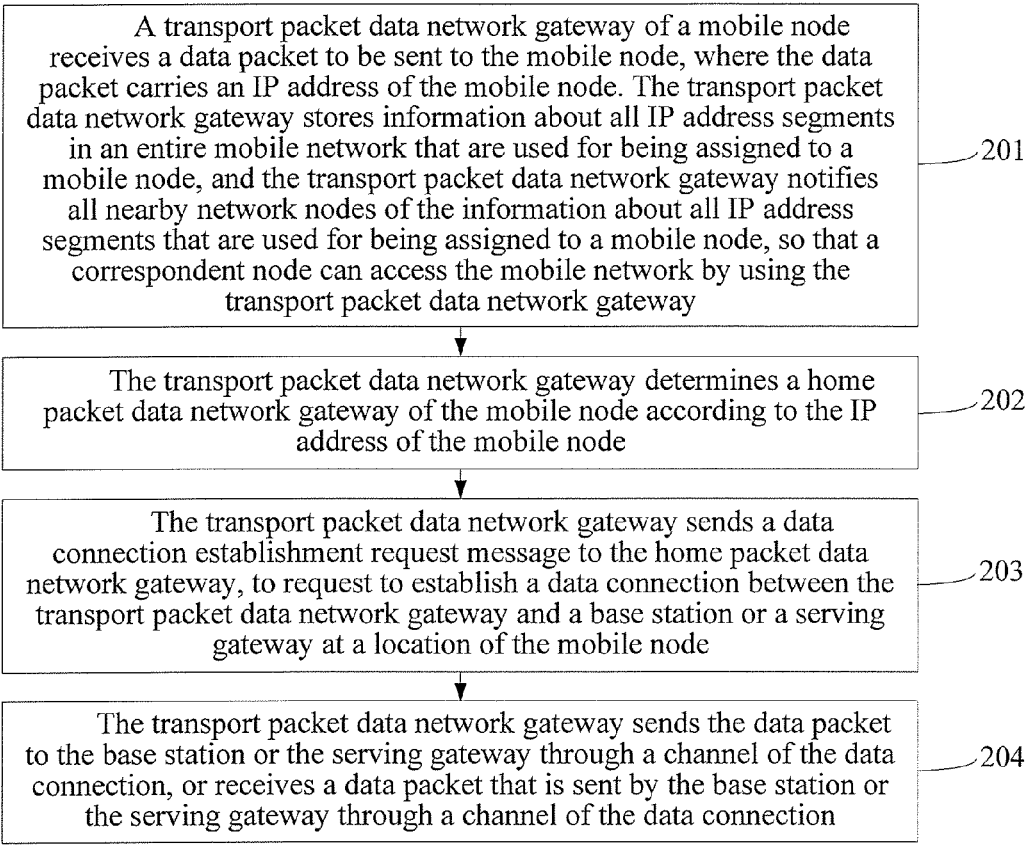
FIG. 2 is a schematic flowchart of a mobile network communications method according to an embodiment of the present invention.

This embodiment of the present invention provides a mobile network communications method, where the method is applied to a transport packet data network gateway T-PGW (Transport PDN Gateway) of a mobile node. The transport packet data network gateway stores information about all IP address segments in an entire mobile network that are used for being assigned to a mobile node, and the transport packet data network gateway notifies all nearby network nodes of the information about all IP address segments that are used for being assigned to a mobile node, so that a correspondent node can access the mobile network by using the transport packet data network gateway. Specifically, as shown in FIG. 2, the method includes:

201: The transport packet data network gateway receives a data packet to be sent to the mobile node, where the data packet carries an IP address of the mobile node.

The transport packet data network gateway refers to a packet data network gateway that needs to forward a packet to a mobile node that does not belong to the packet data network gateway.

Each packet data network gateway has a capability of a transport packet data network gateway. That is, when the correspondent node sends a data packet to the mobile node, the data packet accesses the mobile network by using a local packet data network gateway; the local packet data network gateway has a capability of forwarding a data packet to be sent to a mobile node that does not belong to the local packet data network gateway, and therefore serves as the transport packet data network gateway in this data communication process.

Figure 3:
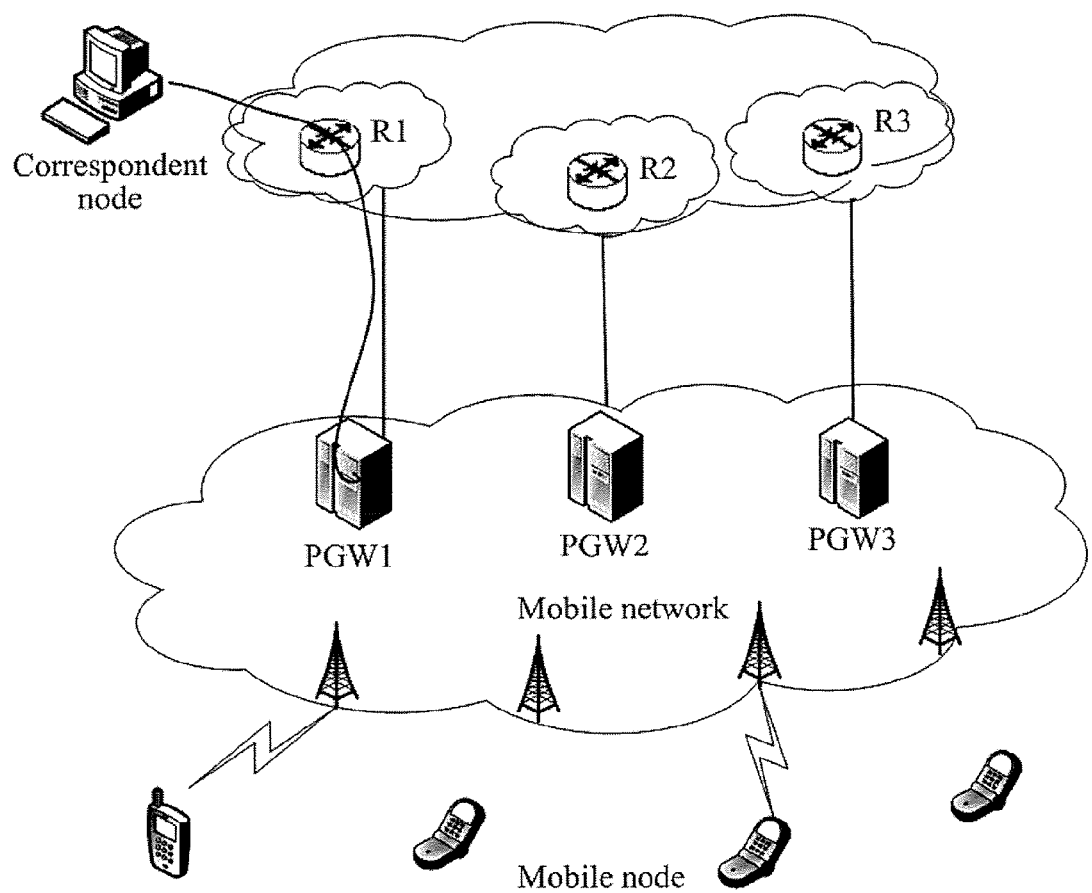
FIG. 3 is a schematic diagram of "network access via nearest gateway" in a mobile network communications method according to an embodiment of the present invention.

Specifically, the transport packet data network gateway is a packet data network gateway nearest to the correspondent node. As shown in FIG. 3, packet data network gateways PGW1, PGW2, and PGW3 all include information about IP address segments assigned by themselves, and also include information about IP address segments of other packet data network gateways. After the correspondent node sends the data packet, a nearby router R1 of the correspondent node routes the data packet to the PGW1 nearest to the correspondent node, so that the data packet sent by the correspondent node to the mobile node can access the mobile network by using the nearest packet data network gateway, completing "network access via nearest gateway".

The receiving, by the transport packet data network gateway, a data packet to be sent to the mobile node specifically includes:

receiving the sent data packet, where the data packet carries information about a target IP address; and comparing the target IP address with an IP address stored by the transport packet data network gateway, to determine whether the received data packet is a data packet to be sent to the mobile node, and if the data packet is not a data packet to be sent to the mobile node, choosing to discard the data packet or report an error; in this way, the transport packet data network gateway eventually processes only a data packet to be sent to the mobile node.

Certainly, whether the received data packet is a data packet to be sent to the mobile node may also be determined in another manner, which is not specifically limited in this embodiment of the present invention.

202: The transport packet data network gateway determines a home packet data network gateway H-PGW (Home PDN Gateway) of the mobile node according to IP address information of the mobile node.

The home packet data network gateway refers to a packet data network gateway to which the mobile node is first attached.

The transport packet data network gateway may determine the home packet data network gateway of the mobile node according to the IP address information of the mobile node in combination with a pre-stored mapping relationship between an IP address segment and the home packet data network gateway. The pre-stored mapping relationship between the IP address segment and the home packet data network gateway may be manually configured, and may also be acquired in another manner, which is not specifically limited in this embodiment of the present invention.

Certainly, the transport packet data network gateway may also query information such as an address of the home packet data network gateway of the mobile node by querying a specific network element. How the transport packet data network gateway determines the home packet data network gateway of the mobile node is not specifically limited in this embodiment of the present invention.

203: The transport packet data network gateway sends a data connection establishment request message to the home packet data network gateway, to request to establish a data connection to a base station or a serving gateway at a location of the mobile node, so that the transport packet data network gateway establishes the data connection to the base station or the serving gateway by using the home packet data network gateway.

The transport packet data network gateway may request to establish the data connection between the transport packet data network gateway and the base station at the location of the mobile node, and may also request to establish the data connection between the transport packet data network gateway and the serving gateway at the location of the mobile node.

The established data connection between the transport packet data network gateway and the base station or the serving gateway may be an established tunnel connection, a dedicated bearer that is set up, or a data connection of another type, which is not specifically limited in this embodiment of the present invention.

After the base station or the serving gateway responds to the data connection establishment request message of the transport packet data network gateway, the base station or the serving gateway stores information about an uplink path and a downlink path for communication performed through a channel of the data connection. If the transport packet data network gateway requests to establish the data connection between the transport packet data network gateway and the base station at the location of the mobile node, a binding relationship from the channel of the data connection to an air interface bearer is used as a downlink direction, and a binding relationship from the air interface bearer+a destination address to the channel of the data connection is used as an uplink direction. If the transport packet data network gateway requests to establish the data connection between the transport packet data network gateway and the serving gateway at the location of the mobile node, a binding relationship from the channel of the data connection to a dedicated bearer is used as a downlink direction, and a binding relationship from the dedicated bearer+a destination address to the channel of the data connection is used as an uplink direction. The dedicated bearer refers to a data channel between the base station and the serving gateway that are at the location of the mobile node, and the air interface bearer refers to a data channel between the mobile node and the base station.

In this way, when the transport packet data network gateway sends a data packet to the mobile node, the base station or the serving gateway receives the data packet and may process the data packet according to the information about the downlink path, or when the mobile node sends a data packet to the correspondent node, the base station or the serving gateway receives the data packet and may process the data packet according to the information about the uplink path.

204: The transport packet data network gateway sends the data packet to the base station or the serving gateway through a channel of the data connection, or receives a data packet that is sent by the base station or the serving gateway through a channel of the data connection.

If the transport packet data network gateway requests to establish the data connection to the base station at the location of the mobile node, after the data connection is established, the transport packet data network gateway may, when receiving a data packet sent by the correspondent node to the mobile node, directly send the data packet to the base station through the channel of the data connection; or the base station directly sends, when receiving a data packet sent by the mobile node to the correspondent node, the received data packet to the transport packet data network gateway through the channel of the data connection. In this way, roundabout routing in the communication process is alleviated.

If the transport packet data network gateway requests to establish the data connection to the serving gateway at the location of the mobile node, after the data connection is established, the transport packet data network gateway may, when receiving a data packet sent by the correspondent node to the mobile node, directly send the data packet to the serving gateway through the channel of the data connection; or the serving gateway directly sends, when receiving a data packet sent by the mobile node to the correspondent node, the received data packet to the transport packet data network gateway through the channel of the data connection. In this way, roundabout routing in the communication process is alleviated.

Figure 4:
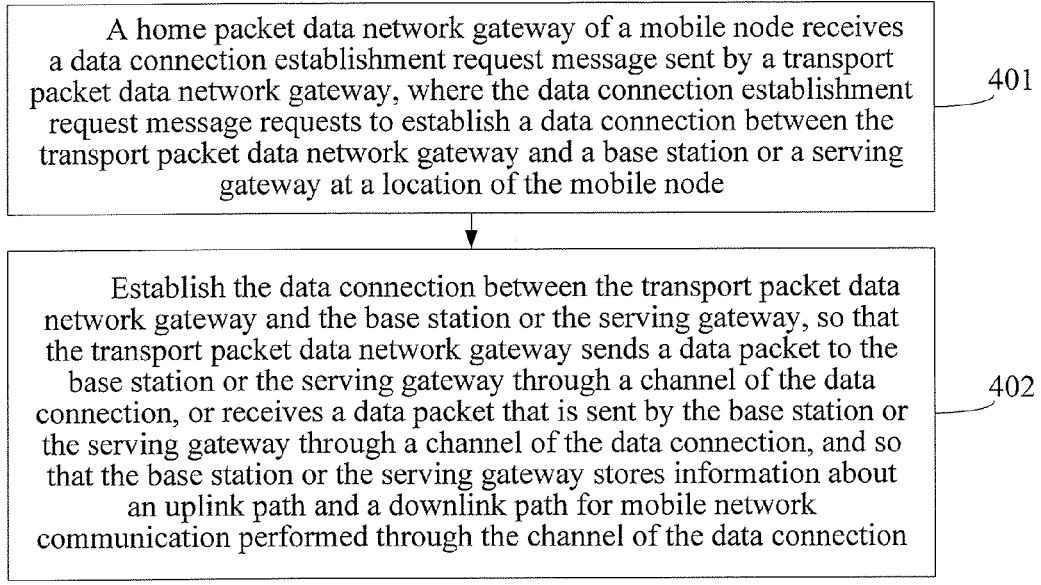
FIG. 4 is a schematic flowchart of another mobile network communications method according to an embodiment of the present invention.

This embodiment of the present invention further provides a mobile network communications method, where the method is applied to a home packet data network gateway of a mobile node. Specifically, as shown in FIG. 4, the method includes:

401: The home packet data network gateway of the mobile node receives a data connection establishment request message sent by a transport packet data network gateway, where the data connection establishment request message requests to establish a data connection between the transport packet data network gateway and a base station or a serving gateway at a location of the mobile node.

The data connection request message is a message that is sent by the transport packet data network gateway to the home packet data network gateway after the transport packet data network gateway receives a data packet to be sent to the mobile node and determines the home packet data network gateway according to IP address information of the mobile node carried in the data packet.

The transport packet data network gateway may request to establish the data connection between the transport packet data network gateway and the base station at the location of the mobile node, and may also request to establish the data connection between the transport packet data network gateway and the serving gateway at the location of the mobile node.

The data connection may be an established tunnel connection, a dedicated bearer that is set up, or a data connection of another type, which is not specifically limited in this embodiment of the present invention.

402: The home packet data network gateway establishes the data connection between the transport packet data network gateway and the base station or the serving gateway, so that the transport packet data network gateway sends a data packet to the base station or the serving gateway through a channel of the data connection, or receives a data packet that is sent by the base station or the serving gateway through a channel of the data connection, and so that the base station or the serving gateway stores information about an uplink path and a downlink path for communication performed through the channel of the data connection.

After receiving the data connection establishment request message sent by the packet data network gateway, the home packet data network gateway performs information exchange with the base station or the serving gateway at the location of the mobile node to establish the data connection between the transport packet data network gateway and the base station or the serving gateway.

After the base station or the serving gateway responds to the data connection establishment request message of the transport packet data network gateway, the base station or the serving gateway stores the information about the uplink path and the downlink path of the communication performed through the channel of the data connection. If the transport packet data network gateway requests to establish the data connection between the transport packet data network gateway and the base station at the location of the mobile node, a binding relationship from the channel of the data connection to an air interface bearer is used as a downlink direction, and a binding relationship from the air interface bearer+a destination address to the channel of the data connection is used as an uplink direction. If the transport packet data network gateway requests to establish the data connection between the transport packet data network gateway and the serving gateway at the location of the mobile node, a binding relationship from the channel of the data connection to a dedicated bearer is used as a downlink direction, and a binding relationship from the dedicated bearer+a destination address to the channel of the data connection is used as an uplink direction. The dedicated bearer refers to a data channel between the base station and the serving gateway that are at the location of the mobile node, and the air interface bearer refers to a data channel between the mobile node and the base station.

In the foregoing mobile network communications method, the data connection is finally established between the transport packet data network gateway and the base station or the serving gateway at the location of the mobile node by using the home packet data network gateway, where the home packet data network gateway includes a user plane and a signaling plane, the user plane is used to receive and send user plane data, and the signaling plane is used to process signaling. During establishment of the data connection, only the signaling plane works. In this way, when a data packet is transferred between the mobile node and the correspondent node, the data packet can be transferred through the channel of the data connection without passing through the home packet data network gateway of the mobile node.

This embodiment of the present invention provides a mobile network communications method. In the method, a transport packet data network gateway stores information about all IP address segments in an entire mobile network that are used for being assigned to a mobile node, and the transport packet data network gateway notifies all nearby network nodes of the information about all IP address segments that are used for being assigned to a mobile node, so that a correspondent node can access the mobile network by using the transport packet data network gateway; after receiving a data packet to be sent to a mobile node, the transport packet data network gateway determines a home packet data network gateway of the mobile node according to IP address information of the mobile node carried in the data packet, and then sends a data connection establishment request message to the home packet data network gateway, to request to establish a data connection between the transport packet data network gateway and a base station or a serving gateway at a location of the mobile node; and after the data connection is established, the transport packet data network gateway sends the data packet to the base station or the serving gateway through a channel of the data connection, or receives a data packet that is sent by the base station or the serving gateway through a channel of the data connection.

Based on the description of the foregoing embodiment, when a mobile node communicates with a correspondent node, a data connection is established between a transport packet data network gateway and a base station or a serving gateway at a location of the mobile node, which can effectively alleviate roundabout routing. Especially when mobile node moves to a coverage range of a non-home packet data network gateway, the mobile node communicates with the correspondent node by establishing the data connection, without taking a roundabout way to a home packet data network gateway of the mobile node for receiving and sending a data packet, which further alleviates roundabout communication routing of the mobile node to a large extent; in addition, because the roundabout routing problem is solved, a transmission resource of a mobile communications system is further saved and end-to-end latency of the mobile node is lowered.

Embodiment 2

Figure 5:
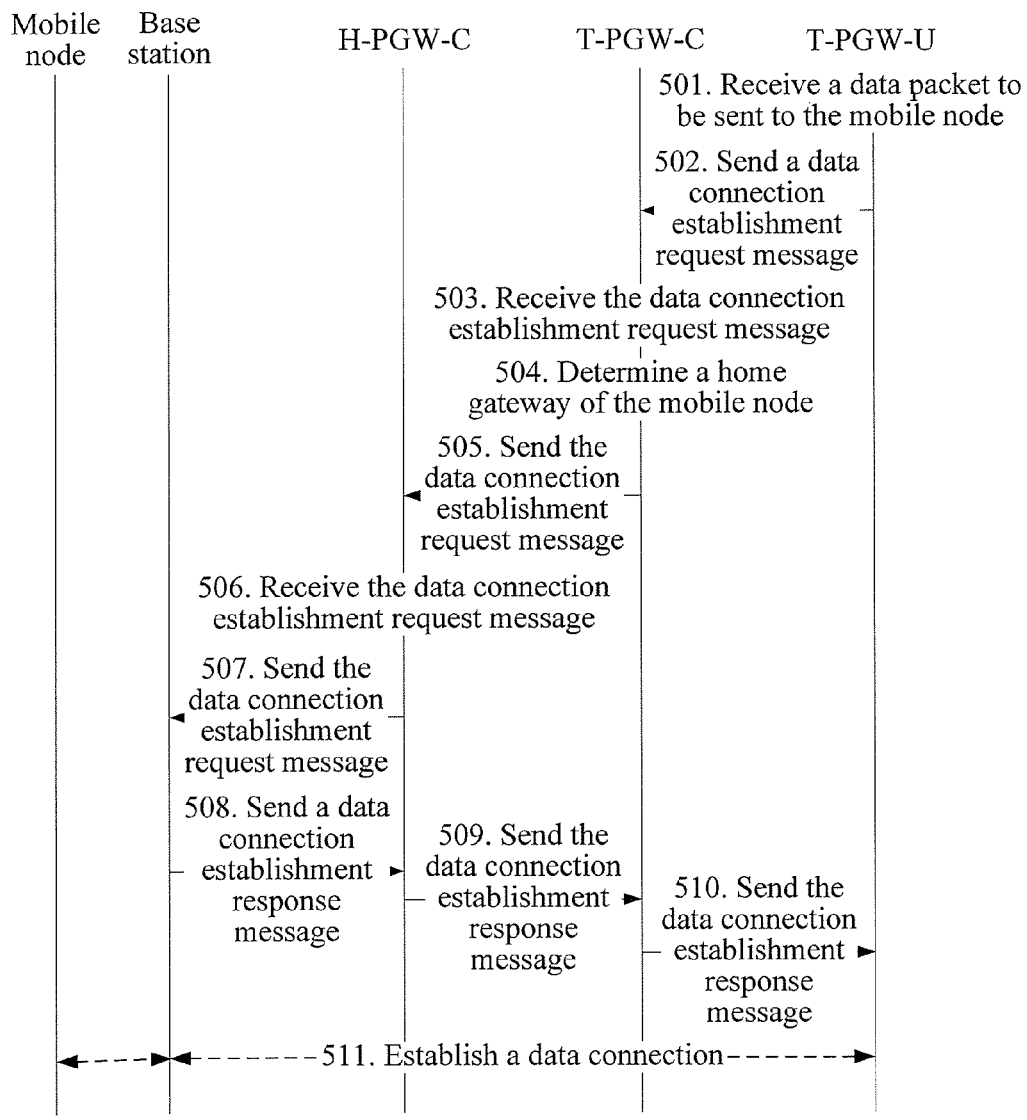
FIG. 5 is a schematic interaction diagram of still another mobile network communications method according to an embodiment of the present invention.

This embodiment of the present invention provides a mobile network communications method, where the method is described based on establishment of a data connection between a transport packet data network gateway and a base station at a location of a mobile node in a mobile communications network, and decoupling (Decoupling) of a user plane and a control plane is separately performed for each packet data network gateway in the mobile communications network, that is, the user plane is separated from the control plane. Specifically, as shown in FIG. 5, the transport packet data network gateway stores information about all IP address segments in an entire mobile network that are used for being assigned to a mobile node, and the transport packet data network gateway notifies all nearby network nodes of the information about all IP address segments that are used for being assigned to a mobile node, so that a correspondent node can access the mobile network by using the transport packet data network gateway, and the method includes:

501: A user plane network element T-PGW-U (T-PGW-User Plane) of the transport packet data network gateway receives a data packet to be sent to the mobile node, where the data packet carries an IP address of the mobile node.

The transport packet data network gateway refers to a packet data network gateway that needs to forward a packet to a mobile node that does not belong to the packet data network gateway.

Each packet data network gateway has a capability of a transport packet data network gateway. That is, when the correspondent node sends a data packet to the mobile node, the data packet accesses the mobile communications network by using a local packet data network gateway; the local packet data network gateway has a capability of forwarding a data packet to be sent to a mobile node that does not belong to the local packet data network gateway, and therefore serves as the transport packet data network gateway in this data communication process.

The transport packet data network gateway includes two parts: a user plane network element and a control plane network element. After the user plane and the control plane of the transport packet data network gateway are decoupled, the transport packet data network gateway includes the user plane network element T-PGW-U and a control plane network element T-PGW-C (T-PGW-Controller Plane). The T-PGW-U is used to receive and send user plane data, and the T-PGW-C is used to process signaling.

The receiving, by a user plane network element of the transport packet data network gateway, a data packet to be sent to the mobile node specifically includes:

receiving the sent data packet, where the data packet carries information about a target IP address; and comparing the target IP address with an IP address stored by the transport packet data network gateway, to determine whether the received data packet is a data packet to be sent to the mobile node, and if the data packet is not a data packet to be sent to the mobile node, choosing to discard the data packet or report an error; in this way, the user plane network element of the transport packet data network gateway eventually processes only a data packet to be sent to the mobile node.

Certainly, whether the received data packet is a data packet to be sent to the mobile node may also be determined in another manner, which is not specifically limited in this embodiment of the present invention.

502: The T-PGW-U sends a data connection establishment request message to a T-PGW-C, where the data connection establishment request message carries the IP address of the mobile node, and requests to establish a first data connection between the T-PGW-U and the base station at the location of the mobile node.

503: The T-PGW-C receives the first data connection establishment request message sent by the T-PGW-U.

504: The T-PGW-C determines a home packet data network gateway of the mobile node according to IP address information of the mobile node.

The home packet data network gateway refers to a packet data network gateway to which the mobile node is first attached.

The transport packet data network gateway may determine the home packet data network gateway of the mobile node according to the IP address information of the mobile node in combination with a pre-stored mapping relationship between an IP address segment and the home packet data network gateway. The pre-stored mapping relationship between the IP address segment and the home packet data network gateway may be manually configured, and may also be acquired in another manner, which is not specifically limited in this embodiment of the present invention.

Certainly, the transport packet data network gateway may also query information such as an address of the home packet data network gateway of the mobile node by querying a specific network element. How the transport packet data network gateway determines the home packet data network gateway of the mobile node is not specifically limited in this embodiment of the present invention.

505: After determining the home packet data network gateway of the mobile node, the T-PGW-C sends the data connection establishment request message to a control plane network element H-PGW-C(H-PGW-Controller Plane) of the home packet data network gateway, to request to establish the first data connection between the T-PGW-U and the base station at the location of the mobile node.

In this embodiment, in a case in which a user plane network element and a control plane network element of the home packet data network gateway are decoupled, only a control plane performs corresponding signaling exchange, and a user plane does not perform any action of forwarding user plane data in the home packet data network gateway; therefore, the home packet data network gateway may specifically be the control plane network element H-PGW-C of the home packet data network gateway.

It should be noted that the first data connection and the following second and third data connections are all common bidirectional data connections, where first, second, and third are merely intended for distinguishing data connections established between the transport packet data network gateway and different nodes, or distinguishing data connections in different network architectures, and do not convey special meanings.

The established first data connection between the transport packet data network gateway and the base station may be an established tunnel connection, a dedicated bearer that is set up, or a bidirectional data connection of another type, which is not specifically limited in this embodiment of the present invention.

506: The H-PGW-C receives the first data connection request message sent by the T-PGW-C.

507: The H-PGW-C sends the first data connection establishment request message to the base station at the location of the mobile node.

508: The base station sends a first data connection establishment response message to the H-PGW-C.

After the base station receives the data connection establishment request message sent by the H-PGW-C, the base station makes preparations for data connection establishment, and maintains two tables, to separately store information about an uplink path and a downlink path for communication performed through a channel of the data connection. A binding relationship from the channel of the data connection to an air interface bearer is used as a downlink direction; a binding relationship from the air interface bearer+a destination address to the channel of the data connection is used as an uplink direction. The air interface bearer refers to a data channel between the mobile node and the base station.

In this way, when the T-PGW-U sends a data packet to the mobile node, the base station receives the data packet and may process the data packet according to the information about the downlink path, or when the mobile node sends a data packet to the correspondent node, the base station receives the data packet and may process the data packet according to the information about the uplink path.

509: The H-PGW-C sends the first data connection establishment response message to the T-PGW-C.

510: The T-PGW-C sends a first data connection establishment complete message to the T-PGW-U.

511: The T-PGW-U sends the data packet to the base station through a channel of the first data connection, or receives a data packet that is sent by the base station through a channel of the first data connection.

After establishment of the first data connection is completed, when receiving a data packet sent by the correspondent node to the mobile node, the T-PGW-U may directly send the data packet to the base station through the channel of the first data connection, or when receiving a data packet sent by the mobile node to the correspondent node, the base station sends the received data packet to the T-PGW-U through the channel of the first data connection.

It should be noted that this embodiment of the present invention is described by using an example in which a control plane and a user plane in a communications apparatus are decoupled. However, the mobile network communications method provided in this embodiment of the present invention is also applicable to a case in which a control plane and a user plane in a communications apparatus in a mobile communications network are not decoupled. Therefore, if no decoupling of a control plane and a user plane is performed for the transport packet data network gateway and the home packet data network gateway, steps 502, 503, and 510 can be omitted and step 504 is merged with step 501, that is, step 501 is: The transport packet data network gateway receives a data packet to be sent to the mobile node and determines a home packet data network gateway of the mobile node, and after determining the home packet data network gateway of the mobile node, directly sends a data connection establishment request message to the home packet data network gateway. Step 509 is: The home packet data network gateway directly sends the data connection response message to the transport packet data network gateway. Step 410 is omitted. Other steps are consistent with the process shown in FIG. 5, and details are not repeated in this embodiment.

Figure 6:
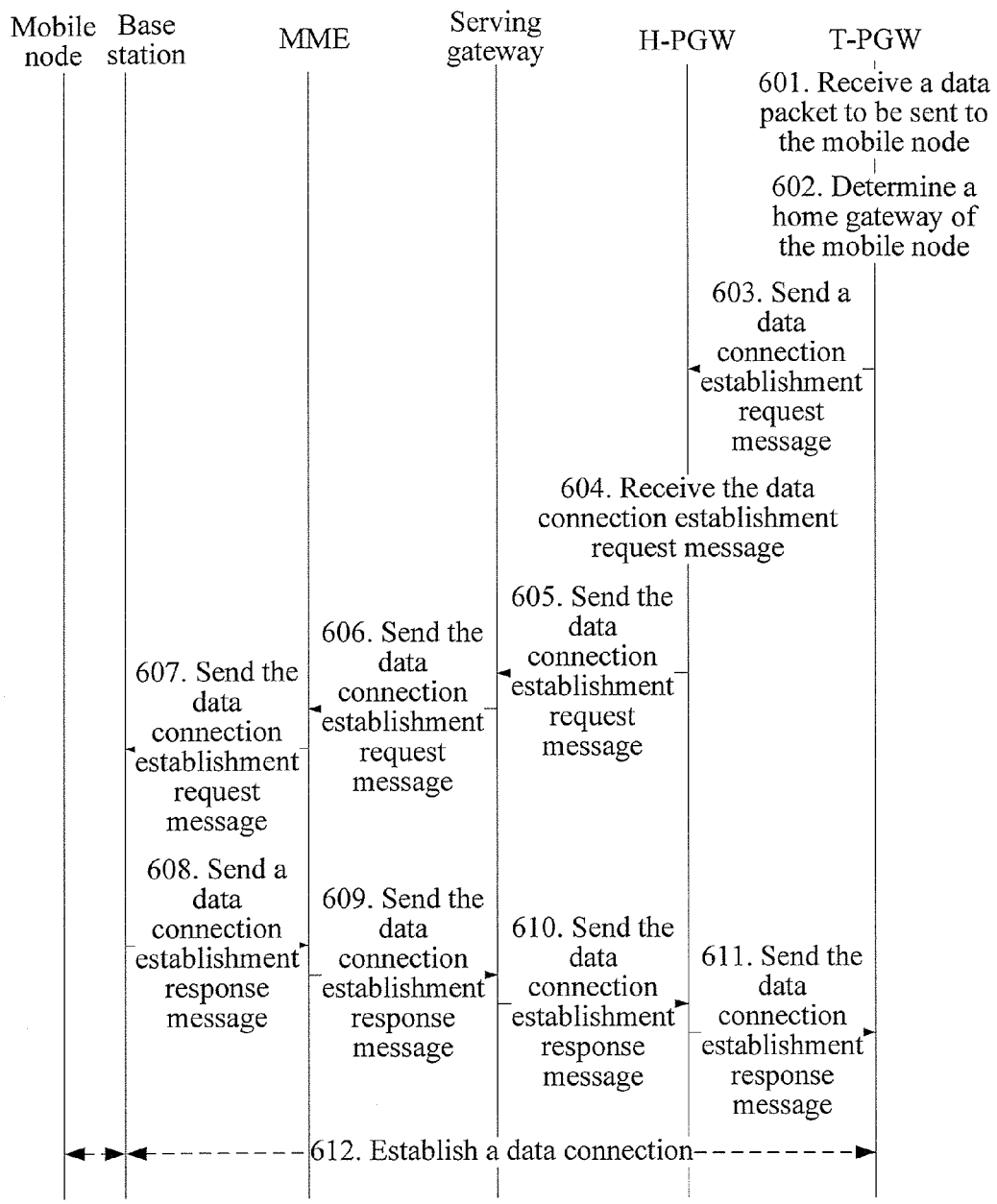
FIG. 6 is a schematic interaction diagram of an SAE architecture-based mobile network communications method according to an embodiment of the present invention.

This embodiment of the present invention further provides a mobile network communications method. In this embodiment of the present invention, on the premise that no network architecture is reconstructed, a data connection between a transport packet data network gateway and a base station at a location of a mobile node is established based on an existing SAE (System architecture evolution, System Architecture Evolution) architecture only by adding signaling exchange between control plane network elements of network nodes in the existing SAE architecture. Specifically, as shown in FIG. 6, the transport packet data network gateway stores information about all IP address segments in an entire mobile network that are used for being assigned to a mobile node, and the transport packet data network gateway notifies all nearby network nodes of the information about all IP address segments that are used for being assigned to a mobile node, so that a correspondent node can access the mobile network by using the transport packet data network gateway. The method includes:

601: The transport packet data network gateway T-PGW receives a data packet to be sent to the mobile node, where the data packet carries an IP address of the mobile node.

The transport packet data network gateway refers to a packet data network gateway that needs to forward a packet to a mobile node that does not belong to the packet data network gateway.

Each packet data network gateway has a capability of a transport packet data network gateway. That is, when the correspondent node sends a data packet to the mobile node, the data packet accesses a mobile communications network by using a local packet data network gateway; the local packet data network gateway has a capability of forwarding a data packet to be sent to a mobile node that does not belong to the local packet data network gateway, and therefore serves as the transport packet data network gateway in this data communication process.

The receiving, by the transport packet data network gateway, a data packet to be sent to the mobile node specifically includes:

receiving the sent data packet, where the data packet carries information about a target IP address; and comparing the target IP address with an IP address segment stored by the transport packet data network gateway, to determine whether the received data packet is a data packet to be sent to the mobile node, and if the data packet is not a data packet to be sent to the mobile node, choosing to discard the data packet or report an error; in this way, the transport packet data network gateway eventually processes only a data packet to be sent to the mobile node.

Certainly, whether the received data packet is a data packet to be sent to the mobile node may also be determined in another manner, which is not specifically limited in this embodiment of the present invention.

602: The transport packet data network gateway determines a home packet data network gateway H-PGW of the mobile node according to IP address information of the mobile node.

The home packet data network gateway refers to a packet data network gateway to which the mobile node is first attached.

The transport packet data network gateway may determine the home packet data network gateway of the mobile node according to the IP address information of the mobile node in combination with a pre-stored mapping relationship between another IP address segment and the home packet data network gateway. The pre-stored mapping relationship between the IP address segment and the home packet data network gateway may be manually configured, and may also be acquired in another manner, which is not specifically limited in this embodiment of the present invention.

Certainly, the transport packet data network gateway may also query information such as an address of the home packet data network gateway of the mobile node by querying a specific network element. How the transport packet data network gateway determines the home packet data network gateway of the mobile node is not specifically limited in this embodiment of the present invention.

603: After determining the home packet data network gateway of the mobile node, the transport packet data network gateway sends a data connection establishment request message to the home packet data network gateway, where the data connection establishment request message requests to establish a second data connection between the transport packet data network gateway and the base station.

The established second data connection between the transport packet data network gateway and the base station may be an established tunnel connection, a dedicated bearer that is set up, or a bidirectional data connection of another type, which is not specifically limited in this embodiment of the present invention.

604: The home packet data network gateway receives the second data connection establishment request message sent by the transport packet data network gateway.

605: The home packet data network gateway sends the second data connection establishment request message to a serving gateway at the location of the mobile node, so that the serving gateway sends the second data connection establishment request message to the base station by using a mobility management entity MME (Mobility Management Entity).

606: The serving gateway sends the second data connection establishment request message to the mobility management entity.

607: The mobility management entity sends the second data connection establishment request message to the base station at the location of the mobile node.

608: The base station sends a second data connection establishment response message to the mobility management entity.

After the base station receives the second data connection establishment request message sent by the MME, the base station makes preparations for data connection establishment, and maintains two tables, to separately store information about an uplink path and a downlink path for communication performed through a channel of the data connection. A binding relationship from the channel of the data connection to an air interface bearer is used as a downlink direction; a binding relationship from the air interface bearer+a destination address to the channel of the data connection is used as an uplink direction. The air interface bearer refers to a data channel between the mobile node and the base station.

In this way, when the transport packet data network gateway sends a data packet to the mobile node, the base station receives the data packet and may process the data packet according to the information about the downlink path, or when the mobile node sends a data packet to the correspondent node, the base station receives the data packet and may process the data packet according to the information about the uplink path.

After completing the preparations for data connection establishment and maintaining the information about the uplink path and the downlink path, the base station sends the second data connection establishment response message to the MME.

609: The mobility management entity sends the second data connection establishment response message to the serving gateway.

610: The serving gateway sends the second data connection establishment response message to the home packet data network gateway.

611: The home packet data network gateway sends a second data connection establishment complete message to the transport packet data network gateway.

612: The transport packet data network gateway sends the data packet to the base station through the second data connection, or receives a data packet that is sent by the base station through the second data connection.

Figure 7:
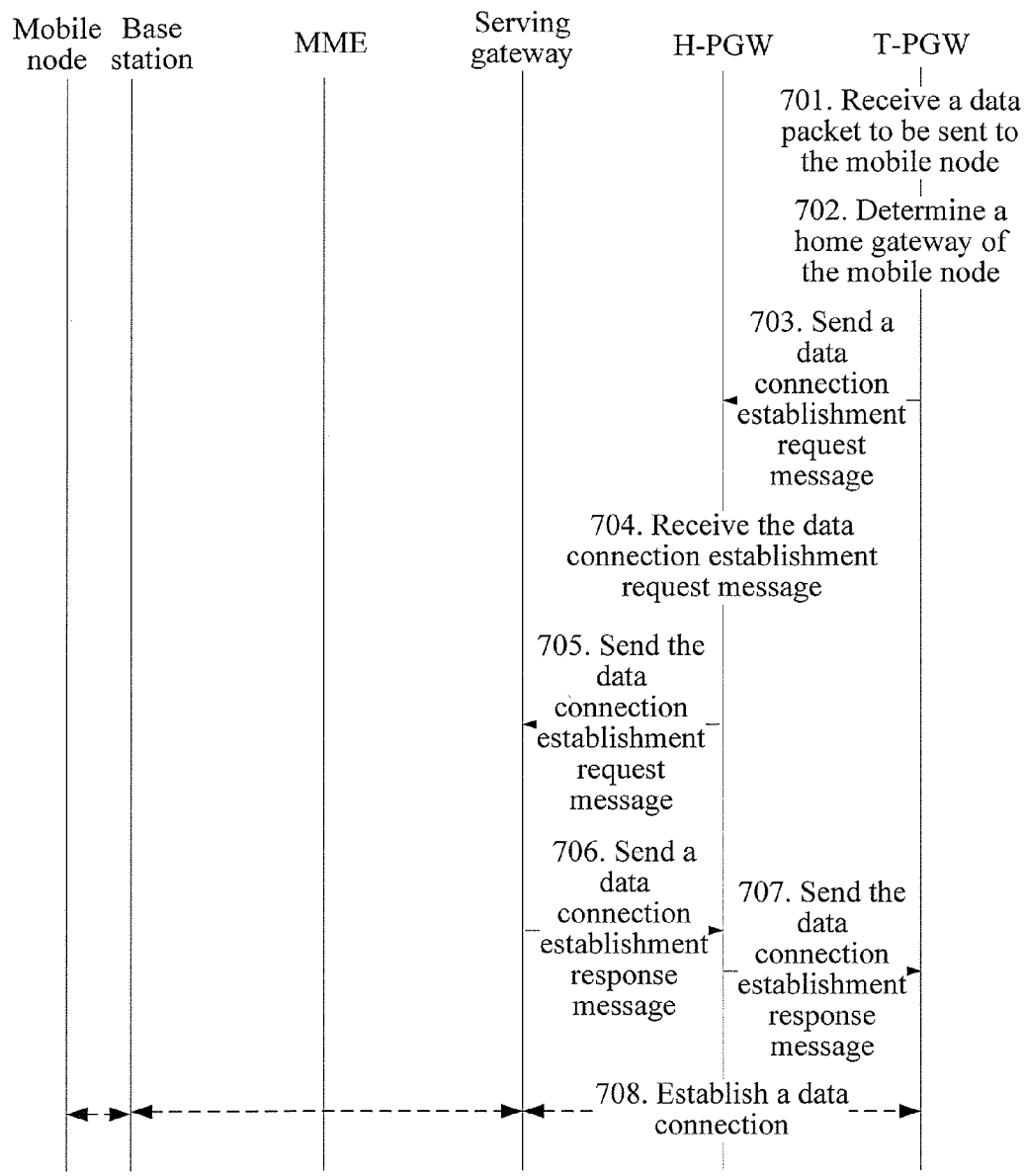
FIG. 7 is a schematic interaction diagram of another SAE architecture-based mobile network communications method according to an embodiment of the present invention.

Optionally, as shown in FIG. 7, this embodiment of the present invention further provides a mobile network communications method. In the method, also on the premise that no network architecture is reconstructed, a data connection between a transport packet data network gateway and a serving gateway at a location of a mobile node is established based on an existing SAE architecture only by adding signaling exchange between control plane network elements of network nodes in the existing SAE architecture. Specifically, as shown in FIG. 7, the transport packet data network gateway stores information about all IP address segments in an entire mobile network that are used for being assigned to a mobile node, and the transport packet data network gateway notifies all nearby network nodes of the information about all IP address segments that are used for being assigned to a mobile node, so that a correspondent node can access the mobile network by using the transport packet data network gateway. The method includes:

701: The transport packet data network gateway T-PGW receives a data packet to be sent to the mobile node, where the data packet carries an IP address of the mobile node.

702: The transport packet data network gateway determines a home packet data network gateway H-PGW of the mobile node according to IP address information of the mobile node.

703: After determining the home packet data network gateway of the mobile node, the transport packet data network gateway sends a data connection establishment request message to the home packet data network gateway, where the data connection establishment request message requests to establish a third data connection between the transport packet data network gateway and the serving gateway.

704: The home packet data network gateway receives the third data connection establishment request message sent by the transport packet data network gateway.

705: The home packet data network gateway sends the third data connection establishment request message to the serving gateway at the location of the mobile node.

706: The serving gateway sends a third data connection establishment response message to the home packet data network gateway.

707: The home packet data network gateway sends a third data connection establishment complete message to the transport packet data network gateway.

708: The transport packet data network gateway sends the data packet to the serving gateway through the third data connection, or receives a data packet that is sent by the serving gateway through the third data connection.

As can be seen, a difference between FIG. 7 and FIG. 6 only lies in that, in step 703 of FIG. 7, the data connection establishment request message sent by the transport packet data network gateway to the home packet data network gateway requests to establish a data connection between the transport packet data network gateway and the serving gateway at the location of the mobile node, whereas in step 603, the data connection establishment request message sent by the transport packet data network gateway to the home packet data network gateway requests to establish a data connection between the transport packet data network gateway and the base station at the location of the mobile node. Therefore, in step 705, after the home packet data network gateway sends the third data connection establishment request message to the serving gateway, the serving gateway receives the third data connection establishment request message sent by the home packet data network gateway; in this case, the serving gateway makes preparations for data connection establishment, and maintains two tables, to separately store information about an uplink path and a downlink path for communication performed through a channel of the data connection. A binding relationship from the channel of the data connection to a dedicated bearer is used as a downlink direction; a binding relationship from the dedicated bearer+a destination address to the channel of the data connection is used as an uplink direction. The dedicated bearer refers to a data channel between the base station and the serving gateway that are at the location of the mobile node. Then in step 706, the serving gateway sends the data connection establishment response message to the home packet data network gateway, and the process of steps 606 to 609 in FIG. 6 is not performed. In this way, signaling exchange with the base station at the location of the mobile node does not need to be performed on a network side, thereby simplifying a signaling exchange process in the data connection establishment process. Other steps in FIG. 7 are the same as the steps in the implementation process shown in FIG. 6. Therefore, reference may be made to the foregoing description of the process steps in FIG. 6, and details are not repeated in this embodiment.

It should be noted that, in a case in which the transport packet data network gateway and the home packet data network gateway are integrated as a whole, the sending, by the transport packet data network gateway, a data connection establishment request message to the home packet data network gateway and a corresponding data connection establishment response message can be omitted, and no specific embodiment is illustrated herein.

Figure 8:
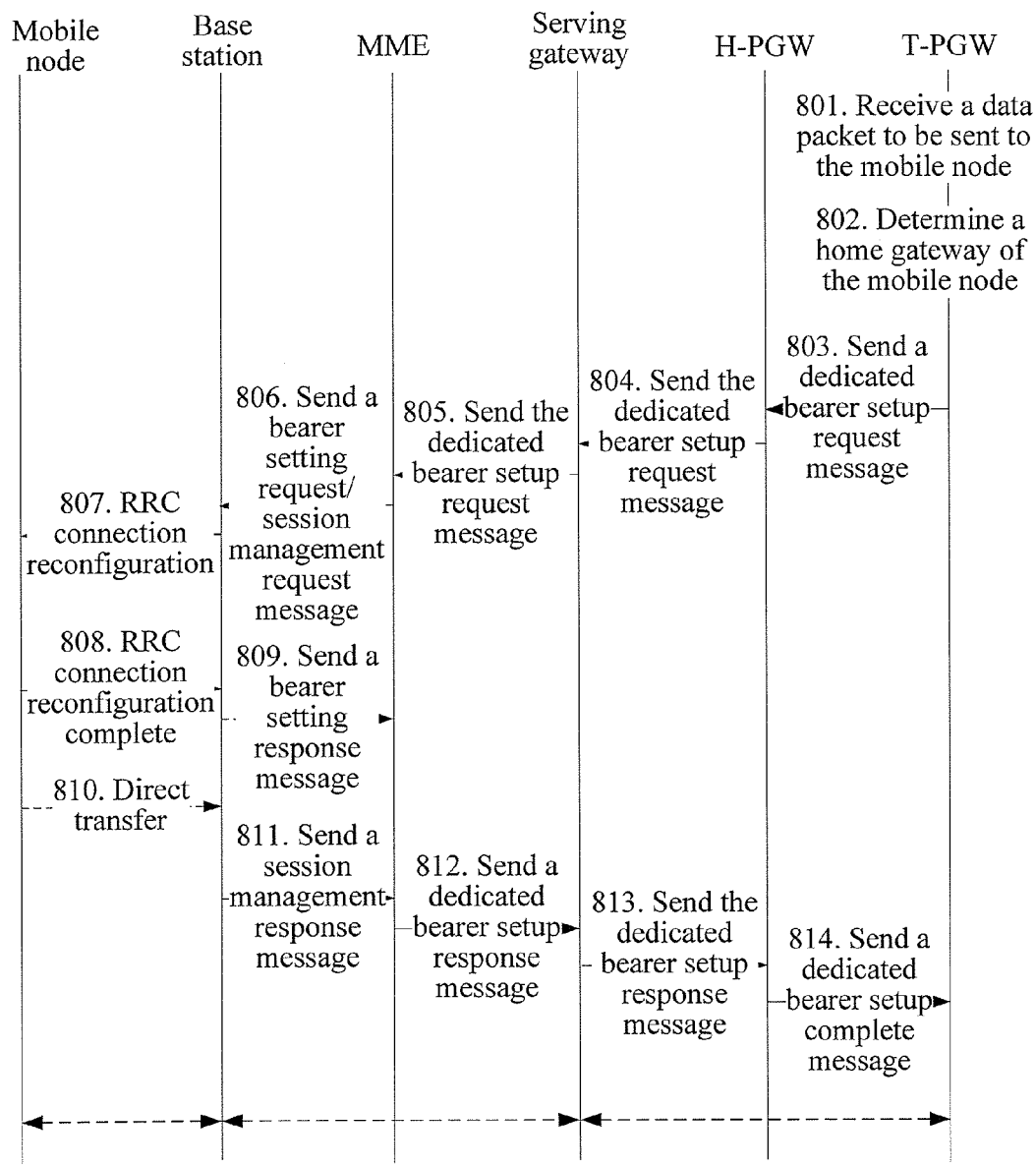
FIG. 8 is a schematic interaction diagram of still another SAE architecture-based mobile network communications method according to an embodiment of the present invention.

Optionally, this embodiment of the present invention further provides a mobile network communications method, where in the method, establishment of a data connection between a transport packet data network gateway and a base station at a location of a mobile node shown in FIG. 6 is specified as setup of a second dedicated bearer. Specifically, as shown in FIG. 8, the method includes:

801: The transport packet data network gateway T-PGW receives a data packet to be sent to the mobile node, where the data packet carries an IP address of the mobile node.

For the concept of the transport packet data network gateway and the specific process in which the transport packet data network gateway receives the data packet to be sent to the mobile node, reference may be made to the description of step 601, and details are not repeated herein.

802: The transport packet data network gateway determines a home packet data network gateway H-PGW of the mobile node according to IP address information of the mobile node.

For the method for determining the home packet data network gateway of the mobile node, reference may be made to the description of step 602, and details are not repeated herein.

803: After determining the home packet data network gateway of the mobile node, the transport packet data network gateway sends a data connection establishment request message to the home packet data network gateway, where the data connection establishment request message requests to set up a second dedicated bearer between the transport packet data network gateway and a serving gateway, and the message further carries an IP address of the transport packet data network gateway and a tunnel endpoint identifier TEID (Tunnel Endpoint Identifier) assigned by the transport packet data network gateway.

According to the IP address of the transport packet data network gateway and the tunnel endpoint identifier TEID assigned by the transport packet data network gateway that are carried in the data connection establishment request message, the second dedicated bearer may be set up between the transport packet data network gateway and the base station or the serving gateway, that is, a channel of a data connection may be established.

It should be noted that the second dedicated bearer and the following first dedicated bearer are both common dedicated bearers, where first and second are merely intended for distinguishing dedicated bearers set up between the transport packet data network gateway and different nodes, and do not convey special meanings.

804: The home packet data network gateway sends the second dedicated bearer setup request message to the serving gateway at the location of the mobile node.

805: The serving gateway sends the second dedicated bearer setup request message to a mobility management entity MME.

806 to 813 are a part of a standard dedicated bearer setup process, and are briefly described herein.

806: The mobility management entity sends a bearer setting request/session management request to the base station at the location of the mobile node.

807: The base station sends an RRC connection reconfiguration message to the mobile node.

808: The mobile node sends an RRC connection reconfiguration complete message to the base station.

809: The base station sends a bearer setting response message to the mobility management entity.

810: The mobile node sends a direct transfer message to the base station.

811: The base station sends a session management response message to the mobility management entity.

812: The mobility management entity sends a second dedicated bearer setup response message to the serving gateway.

After the serving gateway receives the second dedicated bearer setup request message, the serving gateway makes preparations for data connection establishment, and maintains two tables, to separately store information about an uplink path and a downlink path for communication performed through a channel of the data connection. A binding relationship from the second dedicated bearer to a dedicated bearer is used as a downlink direction; a binding relationship from the dedicated bearer+a destination address to the second dedicated bearer is used as an uplink direction. The dedicated bearer refers to a data channel between the base station and the serving gateway that are at the location of the mobile node.

In this way, when the transport packet data network gateway sends a data packet to the mobile node, the serving gateway receives the data packet and may process the data packet according to the information about the downlink path, or when the mobile node sends a data packet to the correspondent node, the serving gateway receives the data packet and may process the data packet according to the information about the uplink path.

813: The serving gateway sends the second dedicated bearer setup response message to the home packet data network gateway.

814: The home packet data network gateway sends a second dedicated bearer setup complete message to the transport packet data network gateway.

When receiving a data packet to be sent to the mobile node, the transport packet data network gateway sends the data packet to the serving gateway through the second dedicated bearer; or the transport packet data network gateway receives a data packet that is sent by the serving gateway through the second dedicated bearer.

Only a specific data packet is allowed to be forwarded by using the dedicated bearer, and a forwarding process follows a standard process.

Figure 9:
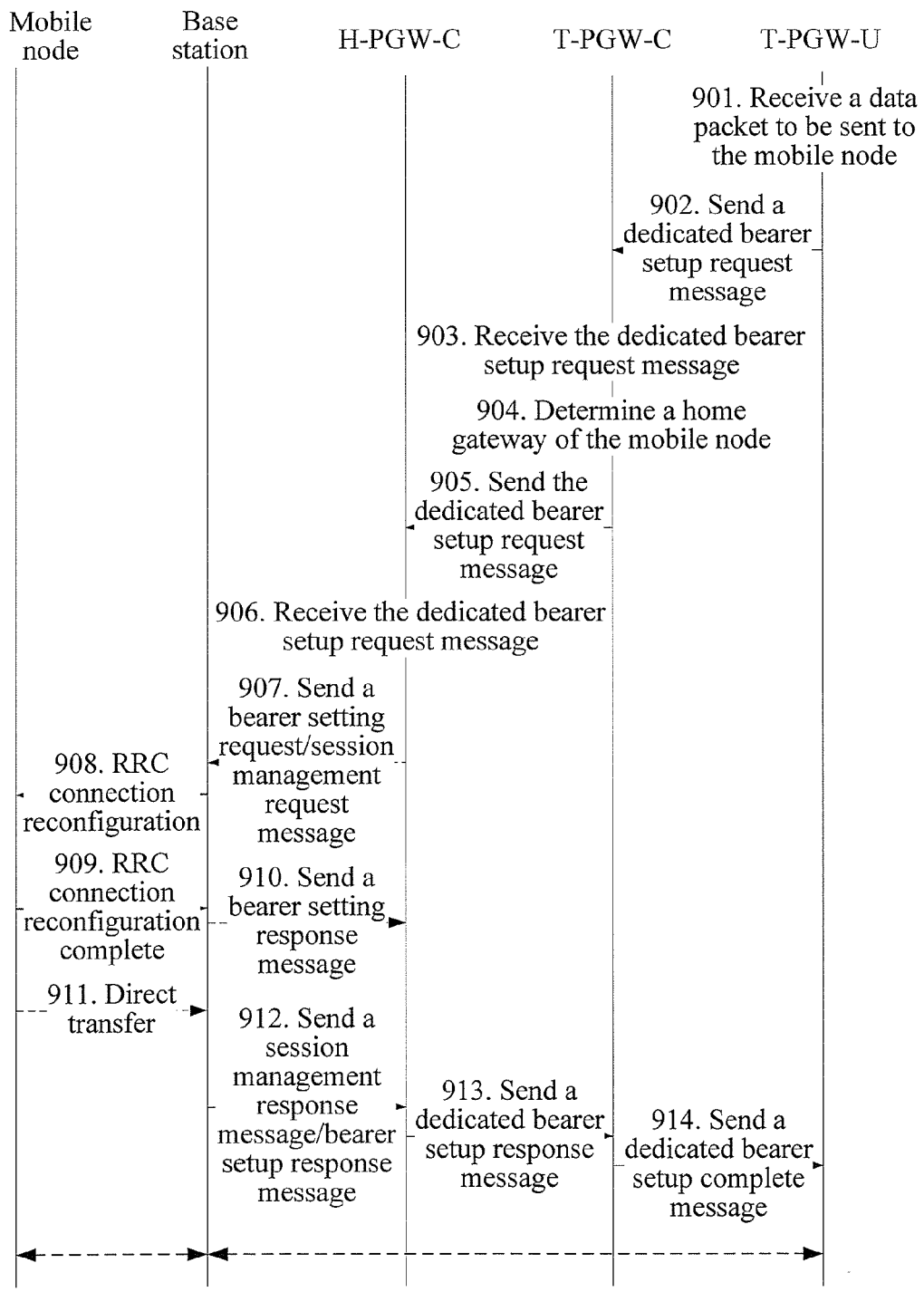
FIG. 9 is a schematic flowchart of still another mobile network communications method according to an embodiment of the present invention.

Optionally, this embodiment of the present invention further provides a mobile network communications method, where in the method, establishment of a data connection between a transport packet data network gateway and a base station at a location of a mobile node shown in FIG. 5 is specified as setup of a first dedicated bearer. Specifically, as shown in FIG. 9, the method includes:

901: A T-PGW-U receives a data packet to be sent to the mobile node, where the data packet carries an IP address of the mobile node.

902: The T-PGW-U sends a data connection establishment request message to a T-PGW-C, where the data connection establishment request message carries the IP address of the mobile node, and requests to set up a first dedicated bearer between the T-PGW-U and the base station at the location of the mobile node.

903: The T-PGW-C receives the first dedicated bearer setup request message sent by the T-PGW-U.

904: The T-PGW-C determines a home packet data network gateway of the mobile node according to IP address information of the mobile node.

905: After determining the home packet data network gateway of the mobile node, the T-PGW-C sends the first dedicated bearer setup request message to an H-PGW-C, where the first dedicated bearer setup request message further carries an IP address of the transport packet data network gateway and a tunnel endpoint identifier TEID assigned by the T-PGW-C to the first dedicated bearer.

906: The H-PGW-C receives the first dedicated bearer setup request message sent by the T-PGW-C.

907: The H-PGW-C sends a bearer setting request/session management request to the base station at the location of the mobile node.

908: The base station sends an RRC connection reconfiguration message to the mobile node.

909: The mobile node sends an RRC connection reconfiguration complete message to the base station.

910: The base station sends a bearer setting response message to a mobility management entity.

911: The mobile node sends a direct transfer message to the base station.

912: The base station sends a session management response message/dedicated bearer setup response message to the H-GW-C.

In this case, the base station makes preparations for data connection establishment, and maintains two tables, to separately store information about an uplink path and a downlink path for communication performed through a channel of the data connection. A binding relationship from the first dedicated bearer to an air interface bearer is used as a downlink direction; a binding relationship from the air interface bearer+a destination address to the first dedicated bearer is used as an uplink direction. The air interface bearer refers to a data channel between the mobile node and the base station.

In this way, when the transport packet data network gateway sends a data packet to the mobile node, the base station receives the data packet and may process the data packet according to the information about the downlink path, or when the mobile node sends a data packet to a correspondent node, the base station receives the data packet and may process the data packet according to the information about the uplink path.

913: The H-PGW-C sends a first dedicated bearer setup response message to the T-PGW-C.

914: The T-PGW-C sends a first dedicated bearer setup complete message to the T-PGW-U.

When receiving a data packet to be sent to the mobile node, the T-PGW-U sends the data packet to the base station through the first dedicated bearer; or the T-PGW-U receives a data packet that is sent by the base station through a channel of the first dedicated bearer.

Only a specific data packet is allowed to be forwarded by using the dedicated bearer, and a forwarding process follows a standard process.

After the data connection is established in the foregoing embodiment, the mobile network communications method further includes charging and DPI (Deep Packet Inspection) deep packet inspection methods.

Specifically, the charging method includes:

before the sending, by the transport packet data network gateway, the data packet to the base station or the serving gateway through a channel of the data connection, or receiving a data packet that is sent by the base station or the serving gateway through a channel of the data connection, sending, by the home packet data network gateway, a first charging indication message to the transport packet data network gateway, where the first charging indication message is used for requesting the transport packet data network gateway to send charging information of the data packet to the home packet data network gateway; and after the sending, by the transport packet data network gateway, the data packet to the base station or the serving gateway through a channel of the data connection, or receiving a data packet that is sent by the base station or the serving gateway through a channel of the data connection, receiving, by the home packet data network gateway, the charging information that is sent by the transport packet data network gateway and is of the data packet, and performing data exchange with a charging center according to the charging information and a charging policy, so as to complete charging for the data packet.

Optionally, the charging method further includes:

before the sending, by the transport packet data network gateway, the data packet to the base station or the serving gateway through a channel of the data connection, or receiving a data packet that is sent by the base station or the serving gateway through a channel of the data connection, sending, by the home packet data network gateway, a second charging indication message to the transport packet data network gateway, where the second charging indication message is used for instructing the transport packet data network gateway to charge for the data packet, so that after sending the data packet to the base station or the serving gateway through the channel of the data connection, or receiving the data packet that is sent by the base station or the serving gateway through the channel of the data connection, the transport packet data network gateway performs data exchange with a charging center according to a charging policy, so as to complete charging for the data packet.

The DPI deep packet inspection method includes:

before the sending, by the transport packet data network gateway, the data packet to the base station or the serving gateway through a channel of the data connection, or after the receiving a data packet that is sent by the base station or the serving gateway through a channel of the data connection, sending, by the home packet data network gateway, a first deep packet inspection DPI request message to the transport packet data network gateway, where the first DPI request message is used for requesting the transport packet data network gateway to perform DPI inspection on the data packet, so that the transport packet data network gateway performs DPI inspection on the data packet according to the first DPI request message and a pre-configured DPI policy.

Optionally, the DPI deep packet inspection method further includes:

before the sending, by the transport packet data network gateway, the data packet to the base station or the serving gateway through a channel of the data connection, or after the receiving a data packet that is sent by the base station or the serving gateway through a channel of the data connection, sending, by the home packet data network gateway, a second DPI request message to the transport packet data network gateway, where the second DPI request message is used for requesting the transport packet data network gateway to send the data packet that meets a condition to the home packet data network gateway for DPI inspection, and the second DPI request message further carries a condition for screening the data packet that meets a condition.

In this way, the transport packet data network gateway obtains the data packet that meets a condition by means of screening according to the condition for screening that is carried in the second DPI request message, and then sends the data packet that meets a condition to the home packet data network gateway.

The home packet data network gateway receives the data packet that is sent by the transport packet data network gateway and meets a condition, and performs DPI inspection on the data packet, and sends an inspection result to the transport packet data network gateway when requested by the transport packet data network gateway.

Optionally, the DPI deep packet inspection method further includes:

before the sending, by the transport packet data network gateway, the data packet to the base station or the serving gateway through a channel of the data connection, or after the receiving a data packet that is sent by the base station or the serving gateway through a channel of the data connection, sending, by the home packet data network gateway, a third DPI request message to the transport packet data network gateway, where the third DPI request message is used for instructing the transport packet data network gateway to send the data packet to an external DPI module for inspection, where the external DPI module is specified by the home packet data network gateway, so that the transport packet data network gateway sends the data packet to the external DPI module specified by the home packet data network gateway, and so that the external DPI module specified by the home packet data network gateway performs DPI inspection on the data packet, and sends an inspection result to the transport packet data network gateway when requested by the transport packet data network gateway.

This embodiment of the present invention provides a mobile network communications method. In the method, a transport packet data network gateway stores information about all IP address segments in an entire mobile network that are used for being assigned to a mobile node, and the transport packet data network gateway notifies all nearby network nodes of the information about all IP address segments that are used for being assigned to a mobile node, so that a correspondent node can access the mobile network by using the transport packet data network gateway; after receiving a data packet to be sent to a mobile node, the transport packet data network gateway determines a home packet data network gateway of the mobile node according to IP address information of the mobile node carried in the data packet, and then sends a data connection establishment request message to the home packet data network gateway, to request to establish a data connection between the transport packet data network gateway and a base station or a serving gateway at a location of the mobile node; and after the data connection is established, the transport packet data network gateway sends the data packet to the base station or the serving gateway through a channel of the data connection, or receives a data packet that is sent by the base station or the serving gateway through a channel of the data connection.

Based on the description of the foregoing embodiment, when a mobile node communicates with a correspondent node, a data connection is established between a transport packet data network gateway and a base station or a serving gateway at a location of the mobile node, which can effectively alleviate roundabout routing. Especially when the mobile node moves to a coverage range of a non-home packet data network gateway, the mobile node communicates with the correspondent node by establishing the data connection, without taking a roundabout way to a home packet data network gateway of the mobile node for receiving and sending a data packet, which further alleviates roundabout communication routing of the mobile node to a large extent; in addition, because the roundabout routing problem is solved, a transmission resource of a mobile communications system is further saved and end-to-end latency of the mobile node is lowered.

Embodiment 3

Each packet data network gateway has a capability of a transport packet data network gateway. That is, when a correspondent node sends a data packet to a mobile node, the data packet accesses a mobile network by using a local packet data network gateway; the local packet data network gateway has a capability of forwarding a data packet to be sent to a mobile node that does not belong to the local packet data network gateway, and therefore serves as a transport packet data network gateway in this data communication process.

Figure 10:
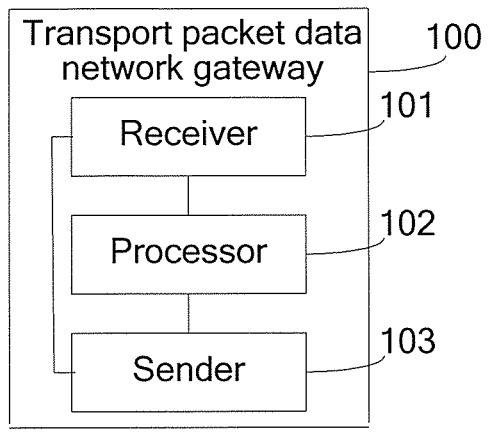
FIG. 10 is a schematic structural diagram of a transport packet data network gateway according to an embodiment of the present invention.

This embodiment of the present invention provides a transport packet data network gateway 100, where the transport packet data network gateway 100 stores information about all IP address segments in an entire mobile network that are used for being assigned to a mobile node, and the transport packet data network gateway 100 notifies all nearby network nodes of the information about all IP address segments that are used for being assigned to a mobile node, so that a correspondent node can access the mobile network by using the transport packet data network gateway 100. Specifically, as shown in FIG. 10, the transport packet data network gateway 100 includes: a receiver 101, a processor 102, and a sender 103.

The receiver 101 is configured to receive a data packet to be sent to a mobile node, and send the data packet to the processor 102, where the data packet carries IP address information of the mobile node.

The receiving, by the receiver 101, a data packet to be sent to a mobile node specifically includes:

receiving the sent data packet, where the data packet carries information about a target IP address; and comparing the target IP address with an IP address stored by the transport packet data network gateway, to determine whether the received data packet is a data packet to be sent to the mobile node, and if the data packet is not a data packet to be sent to the mobile node, choosing to discard the data packet or report an error; in this way, the transport packet data network gateway eventually processes only a data packet to be sent to the mobile node.

Certainly, whether the received data packet is a data packet to be sent to the mobile node may also be determined in another manner, which is not specifically limited in this embodiment of the present invention.

The processor 102 is configured to receive the data packet that is sent by the receiver 101 and carries the IP address information of the mobile node, determine a home packet data network gateway of the mobile node according to the IP address information of the mobile node, and then send IP address information of the home packet data network gateway to the sender 103.

The processor 102 may determine the home packet data network gateway of the mobile node according to the IP address information of the mobile node in combination with a pre-stored mapping relationship between an IP address segment and the home packet data network gateway. The pre-stored mapping relationship between the IP address segment and the home packet data network gateway may be manually configured, and may also be acquired in another manner, which is not specifically limited in this embodiment of the present invention.

Certainly, the processor 102 may also query information such as an address of the home packet data network gateway of the mobile node by querying a specific network element. How the transport packet data network gateway determines the home packet data network gateway of the mobile node is not specifically limited in this embodiment of the present invention.

The sender 103 is configured to receive the IP address information of the home packet data network gateway of the mobile node that is sent by the processor 102, and send a data connection establishment request message to the home packet data network gateway determined by the processor 102, to request to establish a data connection to a base station or a serving gateway at a location of the mobile node, so that the transport packet data network gateway establishes the data connection to the base station or the serving gateway by using the home packet data network gateway.

The transport packet data network gateway 100 may request to establish the data connection to the base station at the location of the mobile node, and may also request to establish the data connection to the serving gateway at the location of the mobile node.

The established data connection between the transport packet data network gateway 100 and the base station or the serving gateway may be an established tunnel connection, a dedicated bearer that is set up, or a bidirectional data connection of another type, which is not specifically limited in this embodiment of the present invention.

After the base station or the serving gateway responds to the data connection establishment request message of the transport packet data network gateway 100, the base station or the serving gateway stores information about an uplink path and a downlink path for communication performed through a channel of the data connection. If the transport packet data network gateway requests to establish the data connection between the transport packet data network gateway and the base station at the location of the mobile node, a binding relationship from the channel of the data connection to an air interface bearer is used as a downlink direction, and a binding relationship from the air interface bearer+a destination address to the channel of the data connection is used as an uplink direction. If the transport packet data network gateway requests to establish the data connection between the transport packet data network gateway and the serving gateway at the location of the mobile node, a binding relationship from the channel of the data connection to a dedicated bearer is used as a downlink direction, and a binding relationship from the dedicated bearer+a destination address to the channel of the data connection is used as an uplink direction. The dedicated bearer refers to a data channel between the base station and the serving gateway that are at the location of the mobile node, and the air interface bearer refers to a data channel between the mobile node and the base station.

In this way, when the transport packet data network gateway sends a data packet to the mobile node, the base station or the serving gateway receives the data packet and may process the data packet according to the information about the downlink path, or when the mobile node sends a data packet to the correspondent node, the base station or the serving gateway receives the data packet and may process the data packet according to the information about the uplink path.

The sender 103 is further configured to send the data packet to the base station or the serving gateway through the channel of the data connection.

The receiver 101 is further configured to receive a data packet that is sent by the base station or the serving gateway through the channel of the data connection.

If the data connection establishment request message sent by the sender 103 requests to establish the data connection to the base station at the location of the mobile node, after the data connection is established, the receiver 101 receives a data packet sent by the correspondent node to the mobile node, and the sender 103 may directly send the data packet to the base station through the channel of the data connection; or the base station receives a data packet sent by the mobile node to the correspondent node, and directly sends the received data packet to the receiver 101 of the transport packet data network gateway through the channel of the data connection. In this way, roundabout routing in the communication process is alleviated.

If the sender 103 requests to establish the data connection to the serving gateway at the location of the mobile node, after the data connection is established, the receiver 101 receives a data packet sent by the correspondent node to the mobile node, and the sender 103 may directly send the data packet to the serving gateway through the channel of the data connection; or the serving gateway receives a data packet sent by the mobile node to the correspondent node, and directly sends the received data packet to the receiver 101 of the transport packet data network gateway through the channel of the data connection. In this way, roundabout routing in the communication process is alleviated.

Optionally, the sending, by the sender 103, a data connection establishment request message to the home packet data network gateway is specifically:

sending a dedicated bearer setup request message to the home packet data network gateway, to request to set up a dedicated bearer to the base station or the serving gateway at the location of the mobile node, where the dedicated bearer setup request message carries an IP address of the transport packet data network gateway and a tunnel endpoint identifier TEID assigned by the transport packet data network gateway, so that the dedicated bearer is set up between the transport packet data network gateway and the serving gateway or the base station according to the IP address and the TEID.

The dedicated bearer is one of the bidirectional data connections.

According to the IP address of the transport packet data network gateway and the tunnel endpoint identifier TEID assigned by the transport packet data network gateway that are carried in the data connection establishment request message, the dedicated bearer may be set up between the transport packet data network gateway and the base station or the serving gateway.

Specifically, for the process of setting up, by the transport packet data network gateway, the dedicated bearer to the base station or the serving gateway by using the home packet data network gateway, reference may be made to the description of the first dedicated bearer and second dedicated bearer setup processes in Embodiment 2, and details are not repeated in this embodiment of the present invention.

Optionally, the home packet data network gateway is specifically a control plane network element of the home packet data network gateway.

In a case in which a user plane network element and a control plane network element of the home packet data network gateway are decoupled, only a control plane performs corresponding signaling exchange, and a user plane does not perform any action of forwarding user plane data in the home packet data network gateway; therefore, the home packet data network gateway may specifically be the control plane network element H-PGW-C of the home packet data network gateway.

Reference may be made to the description of the embodiment shown in FIG. 4, and details are not repeated in this embodiment of the present invention.

Optionally, in a process of charging for the data packet, the receiver 101 is further configured to: before the data packet is sent to the base station or the serving gateway through the channel of the data connection, or the data packet that is sent by the base station or the serving gateway through the channel of the data connection is received, receive a first charging indication message sent by the home packet data network gateway, and send the first charging indication message to the sender 103, where the first charging indication message is used for requesting the transport packet data network gateway to send charging information of the data packet to the home packet data network gateway; and the sender 103 is further configured to: receive the first charging indication message sent by the receiver 101, and after the data packet is sent to the base station or the serving gateway through the channel of the data connection, or the data packet that is sent by the base station or the serving gateway through the channel of the data connection is received, send the charging information of the data packet to the home packet data network gateway, so that the home packet data network gateway performs data exchange with a charging center according to a charging policy, so as to complete charging for the data packet.

Optionally, in a process of charging for the data packet, the receiver 101 is further configured to: before the data packet is sent to the base station or the serving gateway through the channel of the data connection, or the data packet that is sent by the base station or the serving gateway through the channel of the data connection is received, receive a second charging indication message sent by the home packet data network gateway, and send the second charging indication message to the processor 102, where the second charging indication message is used for requesting the transport packet data network gateway to charge for the data packet; and the processor 102 is further configured to: after the data packet is sent to the base station or the serving gateway through the channel of the data connection, or the data packet that is sent by the base station or the serving gateway through the channel of the data connection is received, receive the second charging indication message sent by the receiver 101, and perform data exchange with a charging center according to a charging policy, so as to complete charging for the data packet.

Optionally, in a process of performing DPI on the data packet, the receiver 101 is further configured to: before the data packet is sent to the base station or the serving gateway through the channel of the data connection, or after the data packet that is sent by the base station or the serving gateway through the channel of the data connection is received, receive a first deep packet inspection DPI request message sent by the home packet data network gateway, and send the first DPI request message to the processor 102, where the first DPI request message is used for requesting the transport packet data network gateway to perform DPI inspection on the data packet; and the processor 102 is further configured to receive the first DPI request message sent by the receiver 101, and perform DPI inspection on the data packet according to the first DPI request message and a pre-configured DPI policy.

Optionally, in a process of performing DPI on the data packet, the receiver 101 is further configured to: before the data packet is sent to the base station or the serving gateway through the channel of the data connection, or after the data packet that is sent by the base station or the serving gateway through the channel of the data connection is received, receive a second DPI request message sent by the home packet data network gateway, and send the second DPI request message to the sender 103, where the second DPI request message is used for requesting the transport packet data network gateway to send the data packet that meets a condition to the home packet data network gateway for DPI inspection, and the second DPI request message further carries a condition for screening the data packet that meets a condition; and the sender 103 is further configured to receive the second DPI request message sent by the receiver 101, and send the data packet that meets a condition to the home packet data network gateway according to the second DPI message, so that the home packet data network gateway performs DPI inspection on the data packet according to a DPI policy, and sends an inspection result to the transport packet data network gateway 100 when requested by the transport packet data network gateway 100.

Optionally, in a process of performing DPI on the data packet, the receiver 101 is further configured to: before the data packet is sent to the base station or the serving gateway through the channel of the data connection, or after the data packet that is sent by the base station or the serving gateway through the channel of the data connection is received, receive a third DPI request message sent by the home packet data network gateway, and send the third DPI request message to the sender 103, where the third DPI request message is used for instructing the transport packet data network gateway to send the data packet to an external DPI module for inspection, where the external DPI module is specified by the home packet data network gateway; and the sender 103 is further configured to receive the third DPI request message sent by the receiver 101, and send, according to the third DPI request message, the data packet to the external DPI module specified by the home packet data network gateway, so that the external DPI module specified by the home packet data network gateway performs DPI inspection on the data packet, and sends an inspection result to the transport packet data network gateway 100 when requested by the transport packet data network gateway 100.

This embodiment of the present invention provides a transport packet data network gateway, where the transport packet data network gateway stores information about all IP address segments in an entire mobile network that are used for being assigned to a mobile node, and the transport packet data network gateway notifies all nearby network nodes of the information about all IP address segments that are used for being assigned to a mobile node, so that a correspondent node can access the mobile network by using the transport packet data network gateway.

The transport packet data network gateway includes a receiver, a processor, and a sender. After the receiver receives a data packet to be sent to a mobile node, the processor determines a home packet data network gateway of the mobile node according to IP address information of the mobile node carried in the data packet, and then the sender sends a data connection establishment request message to the home packet data network gateway, to request to establish a data connection to a base station or a serving gateway at a location of the mobile node; after the data connection is established, the transport packet data network gateway sends the data packet to the base station or the serving gateway through a channel of the data connection, or receives a data packet that is sent by the base station or the serving gateway through a channel of the data connection.

Based on the description of the foregoing embodiment, when a mobile node communicates with a correspondent node, a data connection is established between a transport packet data network gateway and a base station or a serving gateway at a location of the mobile node, which can effectively alleviate roundabout routing. Especially when the mobile node moves to a coverage range of a non-home packet data network gateway, the mobile node communicates with the correspondent node by establishing the data connection, without taking a roundabout way to a home packet data network gateway of the mobile node for receiving and sending a data packet, which further alleviates roundabout communication routing of the mobile node to a large extent; in addition, because the roundabout routing problem is solved, a transmission resource of a mobile communications system is further saved and end-to-end latency of the mobile node is lowered.

Embodiment 4

Figure 11:
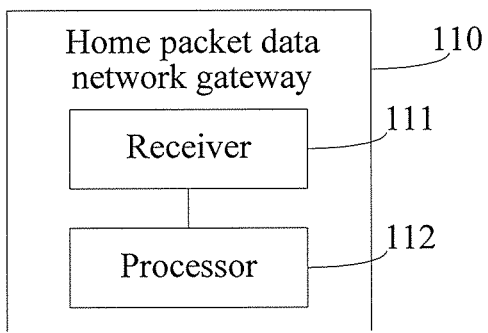
FIG. 11 is a schematic structural diagram of a home packet data network gateway according to an embodiment of the present invention.

This embodiment of the present invention further provides a home packet data network gateway 110. Specifically, as shown in FIG. 11, the home packet data network gateway 110 includes a receiver 111 and a processor 112.

The receiver 111 is configured to receive a data connection establishment request message sent by a transport packet data network gateway, and send the data connection establishment request message to the processor 112, where the data connection establishment request message requests to establish a data connection between the transport packet data network gateway and a base station or a serving gateway at a location of a mobile node.

The data connection request message is a message that is sent by the transport packet data network gateway to a home packet data network gateway of the mobile node after the transport packet data network gateway receives a data packet to be sent to the mobile node and determines the home packet data network gateway according to IP address information of the mobile node carried in the data packet.

The transport packet data network gateway may request to establish the data connection between the transport packet data network gateway and the base station at the location of the mobile node, and may also request to establish the data connection between the transport packet data network gateway and the serving gateway at the location of the mobile node.

The data connection may be an established tunnel connection, a dedicated bearer that is set up, or a bidirectional data connection of another type, which is not specifically limited in this embodiment of the present invention.

The processor 112 is configured to receive the data connection request message sent by the receiver 111, and establish the data connection between the transport packet data network gateway and the base station or the serving gateway, so that the transport packet data network gateway sends the data packet to the base station or the serving gateway through a channel of the data connection, or receives a data packet that is sent by the base station or the serving gateway through a channel of the data connection, and so that the base station sends the data packet to the mobile node or the serving gateway sends the data packet to the mobile node by using the base station, where the base station or the serving gateway stores information about an uplink path and a downlink path for communication performed through the data connection.

After receiving the data connection establishment request message sent by the packet data network gateway, the processor 112 performs information exchange with the base station or the serving gateway at the location of the mobile node, to establish the data connection between the transport packet data network gateway and the base station or the serving gateway.

After the base station or the serving gateway responds to the data connection establishment request message of the transport packet data network gateway, the base station or the serving gateway stores the information about the uplink path and the downlink path of the communication performed through the channel of the data connection. If the transport packet data network gateway requests to establish the data connection between the transport packet data network gateway and the base station at the location of the mobile node, a binding relationship from the channel of the data connection to an air interface bearer is used as a downlink direction, and a binding relationship from the air interface bearer+a destination address to the channel of the data connection is used as an uplink direction. If the transport packet data network gateway requests to establish the data connection between the transport packet data network gateway and the serving gateway at the location of the mobile node, a binding relationship from the channel of the data connection to a dedicated bearer is used as a downlink direction, and a binding relationship from the dedicated bearer+a destination address to the channel of the data connection is used as an uplink direction. The dedicated bearer refers to a data channel between the base station and the serving gateway that are at the location of the mobile node, and the air interface bearer refers to a data channel between the mobile node and the base station.

In this way, when the transport packet data network gateway sends a data packet to the mobile node, the base station or the serving gateway receives the data packet and may process the data packet according to the information about the downlink path, or when the mobile node sends a data packet to the correspondent node, the base station or the serving gateway receives the data packet and may process the data packet according to the information about the uplink path.

Optionally, the establishing, by the processor 112, the data connection between the transport packet data network gateway and the base station specifically includes:

sending a first data connection establishment request message to the base station, to request the base station to establish the data connection to the transport packet data network gateway; and receiving a first data connection establishment response message sent by the base station, and sending the first IP connection response message to the transport packet data network gateway.

Specifically, for the process of establishing, by the transport packet data network gateway, a first data connection to the base station by using the home packet data network gateway, reference may be made to the description of the embodiment shown in FIG. 5, and details are not repeated in this embodiment of the present invention.

Optionally, the establishing, by the processor 112, the data connection between the transport packet data network gateway and the base station specifically includes:

sending a second data connection establishment request message for requesting the base station to establish the data connection to the transport packet data network gateway, to the serving gateway, so that the serving gateway sends the second data connection establishment request message to the base station by using a mobility management entity;

receiving a second data connection establishment response message that is sent by the base station by using the mobility management entity and the serving gateway; and sending the second data connection establishment response message to the transport packet data network gateway.

Specifically, for the process of establishing, by the transport packet data network gateway, a second data connection to the base station by using the home packet data network gateway, reference may be made to the description of the embodiment shown in FIG. 6, and details are not repeated in this embodiment of the present invention.

Optionally, the establishing, by the processor 112, the data connection between the transport packet data network gateway and the serving gateway specifically includes:

sending a third data connection establishment request message to the serving gateway, to request the serving gateway to establish the data connection to the transport packet data network gateway; and receiving a third data connection establishment response message sent by the serving gateway, and sending the third data connection response message to the transport packet data network gateway.

Specifically, for the process of establishing, by the transport packet data network gateway, a third data connection to the serving gateway by using the home packet data network gateway, reference may be made to the description of the embodiment shown in FIG. 7, and details are not repeated in this embodiment of the present invention.

Optionally, the data connection establishment request message is a dedicated bearer setup request message, where the dedicated bearer setup request message carries an IP address of the transport packet data network gateway and a tunnel endpoint identifier TEID assigned by the transport packet data network gateway; and the establishing, by the processor 112, the data connection between the transport packet data network gateway and the base station specifically includes:

the processor 112 is configured to set up a first dedicated bearer between the transport packet data network gateway and the base station according to the IP address of the transport packet data network gateway and the assigned TEID.

Specifically, for the process of setting up, by the transport packet data network gateway, the first dedicated bearer to the base station by using the home packet data network gateway, reference may be made to the description of the embodiment shown in FIG. 9, and details are not repeated in this embodiment of the present invention.

Optionally, the data connection establishment request message is a dedicated bearer setup request message, where the dedicated bearer setup request message carries an IP address of the transport packet data network gateway and a tunnel endpoint identifier TEID assigned by the transport packet data network gateway; and the establishing, by the processor 112, the data connection between the transport packet data network gateway and the serving gateway specifically includes:

the processor 112 is further configured to set up a second dedicated bearer between the transport packet data network gateway and the serving gateway according to the IP address of the transport packet data network gateway and the assigned TEID.

Specifically, for the process of establishing, by the transport packet data network gateway, the second dedicated bearer to the serving gateway by using the home packet data network gateway, reference may be made to the description of the embodiment shown in FIG. 8, and details are not repeated in this embodiment of the present invention.

Figure 12:
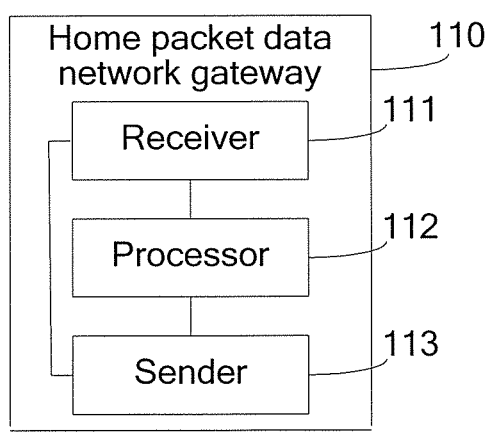
FIG. 12 is a schematic structural diagram of another home packet data network gateway according to an embodiment of the present invention.

Optionally, as shown in FIG. 12, the home packet data network gateway 110 further includes a sender 113.

In a process of charging for the data packet, the sender 113 is further configured to: before the transport packet data network gateway sends the data packet to the base station or the serving gateway through the channel of the data connection, or receives the data packet that is sent by the base station or the serving gateway through the channel of the data connection, send a first charging indication message to the transport packet data network gateway, where the first charging indication message is used for requesting the transport packet data network gateway to send charging information of the data packet to the home packet data network gateway;

the receiver 111 is further configured to: after the transport packet data network gateway sends the data packet to the base station or the serving gateway through the channel of the data connection, or receives the data packet that is sent by the base station or the serving gateway through the channel of the data connection, receive the charging information, sent by the transport packet data network gateway, of the data packet, and send the charging information of the data packet to the processor 112; and the processor 112 is further configured to receive the charging information, sent by the receiver 111, of the data packet, and perform exchange with a charging center according to the charging information and a charging policy, so as to complete charging for the data packet.

Optionally, in a process of charging for the data packet, the sender 113 is further configured to: before the transport packet data network gateway sends the data packet to the base station or the serving gateway through the channel of the data connection, or receives the data packet that is sent by the base station or the serving gateway through the channel of the data connection, send a second charging indication message to the transport packet data network gateway, where the second charging indication message is used for instructing the transport packet data network gateway to charge for the data packet, so that after sending the data packet to the base station or the serving gateway through the channel of the data connection, or receiving the data packet that is sent by the base station or the serving gateway through the channel of the data connection, the transport packet data network gateway performs data exchange with a charging center according to a charging policy, so as to complete charging for the data packet.

Optionally, in a process of performing DPI on the data packet, the sender 113 is further configured to: before the transport packet data network gateway sends the data packet to the base station or the serving gateway through the channel of the data connection, or after the transport packet data network gateway receives the data packet that is sent by the base station or the serving gateway through the channel of the data connection, send a first deep packet inspection DPI request message to the transport packet data network gateway, where the first DPI request message is used for requesting the transport packet data network gateway to perform DPI inspection on the data packet, so that the transport packet data network gateway performs DPI inspection on the data packet according to the DPI request message and a pre-configured DPI policy.

Optionally, in a process of performing DPI on the data packet, the sender 113 is further configured to: before the transport packet data network gateway sends the data packet to the base station or the serving gateway through the channel of the data connection, or after the transport packet data network gateway receives the data packet that is sent by the base station or the serving gateway through the channel of the data connection, send a second DPI request message to the transport packet data network gateway, where the second DPI request message is used for requesting the transport packet data network gateway to send the data packet that meets a condition to the receiver 111, and the second DPI request message further carries a condition for screening the data packet that meets a condition;

in this way, the transport packet data network gateway obtains the data packet that meets a condition by means of screening according to the condition for screening that is carried in the second DPI request message, and then sends the data packet that meets a condition to the home packet data network gateway 110;

the receiver 111 is further configured to receive the data packet sent by the transport packet data network gateway, and send the data packet to the processor 112; and the processor 112 is further configured to receive the data packet sent by the receiver 111 and perform, according to a DPI policy, DPI inspection on the data packet that meets a condition, and send an inspection result to the transport packet data network gateway by using the sender 113 when requested by the transport packet data network gateway.

Optionally, in a process of performing DPI on the data packet, the sender 113 is further configured to: before the transport packet data network gateway sends the data packet to the base station or the serving gateway through the channel of the data connection, or after the transport packet data network gateway receives the data packet that is sent by the base station or the serving gateway through the channel of the data connection, send a third DPI request message to the transport packet data network gateway, where the third DPI request message is used for instructing the transport packet data network gateway to send the data packet to an external DPI module for inspection, where the external DPI module is specified by the home packet data network gateway, so that the transport packet data network gateway sends the data packet to the external DPI module specified by the home packet data network gateway, and so that the external DPI module specified by the home packet data network gateway performs DPI inspection on the data packet, and sends an inspection result to the transport packet data network gateway when requested by the transport packet data network gateway.

This embodiment of the present invention provides a home packet data network gateway, where the home packet data network gateway includes a receiver and a processor. The receiver receives a data connection establishment request message sent by a transport packet data network gateway, where the data connection establishment request message requests to establish a data connection between the transport packet data network gateway and a base station or a serving gateway at a location of a mobile node; the processor establishes the data connection between the transport packet data network gateway and the base station or the serving gateway, so that the transport packet data network gateway sends a data packet to the base station or the serving gateway through a data channel, or receives a data packet that is sent by the base station or the serving gateway through a channel of the data connection. The base station or the serving gateway stores messages of an uplink path and a downlink path for communication performed through the data connection.

The data connection is finally established between the transport packet data network gateway and the base station or the serving gateway at the location of the mobile node by using the home packet data network gateway, where the home packet data network gateway includes a user plane and a signaling plane, the user plane is used to receive and send user plane data, and the signaling plane is used to process signaling. During establishment of the data connection, only the signaling plane works. In this way, when the mobile node moves to a coverage range of a non-home packet data network gateway, the mobile node communicates with a correspondent node by establishing the data connection, without taking a roundabout way to the home packet data network gateway of the mobile node for receiving and sending a data packet, which alleviates roundabout communication routing of the mobile node to a large extent; in addition, because the roundabout routing problem is solved, a transmission resource of a mobile communications system is further saved and end-to-end latency of the mobile node is lowered.

Embodiment 5

Figure 13:
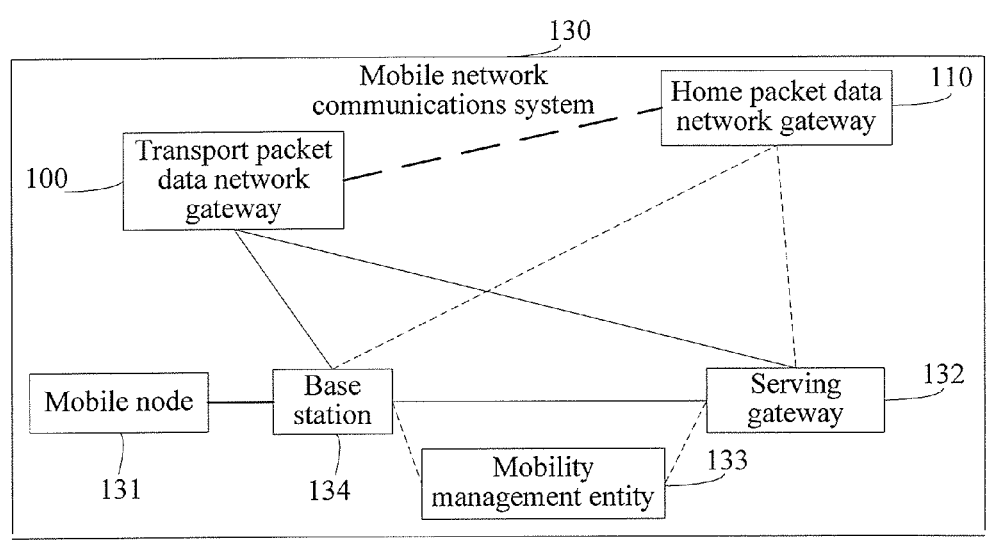
FIG. 13 is a schematic diagram of a mobile network communications system according to an embodiment of the present invention.

This embodiment of the present invention further provides a mobile network communications system 130. Specifically, as shown in FIG. 13, a dashed line represents a signaling transfer path for data connection establishment, and a solid line represents an actual path for data packet transfer. The mobile network communications system 130 includes a mobile node 131, a serving gateway 132, mobility management entity 133, and base station 134 at a location of the mobile node, a home packet data network gateway 110 of the mobile node, and a transport packet data network gateway 100.

The transport packet data network gateway 100 stores information about all IP address segments in an entire mobile network that are used for being assigned to a mobile node, and the transport packet data network gateway notifies all nearby network nodes of the information about all IP address segments that are used for being assigned to a mobile node, so that a correspondent node can access the mobile network by using the transport packet data network gateway.

The transport packet data network gateway 100 is configured to: receive a data packet to be sent to the mobile node 131, and determine the home packet data network gateway 110 of the mobile node 131 according to IP address information of the mobile node 131 carried in the data packet; and then send a data connection establishment request message to the home packet data network gateway 110, to request to establish a data connection between the transport packet data network gateway 100 and the base station 134 or the serving gateway 132.

The home packet data network gateway 110 receives the data connection establishment request message sent by the transport packet data network gateway 100, and establishes the data connection between the transport packet data network gateway 100 and the base station 134 or the serving gateway 132.

The transport packet data network gateway 100 is further configured to send the data packet to the base station 134 or the serving gateway 132 through a channel of the data connection, or receive a data packet that is sent by the base station 134 or the serving gateway 132 through a channel of the data connection.

After the data connection is established, the base station 134 or the serving gateway 132 stores information about an uplink path and a downlink path for communication performed through the channel of the data connection.

For a specific working process of the mobile network communications system, reference may be made to the description of Embodiments 1 and 2, and details are not repeated in this embodiment.

This embodiment of the present invention provides a mobile network communications system, where the mobile communications system includes a mobile node, a serving gateway, mobility management entity, and base station at a location of the mobile node, a home packet data network gateway of the mobile node, and transport packet data network gateway. The transport packet data network gateway stores information about all IP address segments in an entire mobile network that are used for being assigned to a mobile node, and the transport packet data network gateway notifies all nearby network nodes of the information about all IP address segments that are used for being assigned to a mobile node, so that a correspondent node can access the mobile network by using the transport packet data network gateway. After receiving a data packet to be sent to the mobile node, the transport packet network gateway determines the home packet data network gateway of the mobile node according to an IP address of the mobile node, and then sends a data connection establishment request message to the home packet data network gateway, so that the home packet data network gateway establishes a data connection between the transport packet data network gateway and the base station or the serving gateway. The base station or the serving gateway stores information about an uplink path and a downlink path for communication performed through the data connection.

In this way, the mobile node can perform communication by establishing the data connection, which effectively alleviates roundabout routing. Especially when the mobile node moves to a coverage range of a non-home packet data network gateway, the mobile node communicates with a correspondent node by establishing the data connection, without taking a roundabout way to the home packet data network gateway of the mobile node for receiving and sending a data packet, which further alleviates roundabout communication routing of the mobile node to a large extent; in addition, because the roundabout routing problem is solved, a transmission resource of a mobile communications system is further saved and end-to-end latency of the mobile node is lowered.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A mobile network communications method, comprising:
   receiving a data packet to be sent to a mobile node, wherein the data packet carries internet protocol (IP) address information of the mobile node;
   determining a home packet data network gateway of the mobile node according to the IP address information of the mobile node;
   sending a data connection establishment request message to the home packet data network gateway, to request to establish a data connection to a base station or a serving gateway at a location of the mobile node, so that a transport packet data network gateway establishes the data connection to the base station or the serving gateway by using the home packet data network gateway, wherein the transport packet data network gateway stores information about all IP address segments in an entire mobile network that are used for being assigned to a mobile node, and the transport packet data network gateway notifies all nearby network nodes of the information about all IP address segments that are used for being assigned to a mobile node, so that a correspondent node can access the mobile network by using the transport packet data network gateway; and
   sending the data packet to the base station or the serving gateway through a channel of the data connection, or receiving a data packet that is sent by the base station or the serving gateway through a channel of the data connection.

2. The method according to claim 1, wherein determining a home packet data network gateway of the mobile node according to the IP address information of the mobile node comprises:
   querying a specific network element according to the IP address information of the mobile node, so as to determine the home packet data network gateway of the mobile node; or
   querying a pre-configured mapping relationship between an IP address segment and the home packet data network gateway according to an IP address of the mobile node, so as to determine the home packet data network gateway of the mobile node.

3. The method according to claim 1, wherein sending a data connection establishment request message to the home packet data network gateway comprises:
   sending a dedicated bearer setup request message to the home packet data network gateway, to request to set up a dedicated bearer to the base station or the serving gateway at the location of the mobile node, wherein the dedicated bearer setup request message carries an IP address of the transport packet data network gateway and a tunnel endpoint identifier (TEID) assigned by the transport packet data network gateway, so that the dedicated bearer is set up between the transport packet data network gateway and the serving gateway or the base station according to the IP address and the TEID.

4. The method according to claim 1, wherein the home packet data network gateway is a control plane network element of the home packet data network gateway.

5. The method according to claim 1, wherein:
   before sending the data packet to the base station or the serving gateway through a channel of the data connection, or receiving a data packet that is sent by the base station or the serving gateway through a channel of the data connection, the method further comprises:
   receiving a first charging indication message sent by the home packet data network gateway, wherein the first charging indication message is used for requesting the transport packet data network gateway to send charging information of the data packet to the home packet data network gateway; and
   after sending the data packet to the base station or the serving gateway through a channel of the data connection, or receiving a data packet that is sent by the base station or the serving gateway through a channel of the data connection, the method further comprises:
   sending the charging information of the data packet to the home packet data network gateway, so that the home packet data network gateway performs data exchange with a charging center according to a charging policy, so as to complete charging for the data packet.

6. The method according to claim 1, wherein:
   before sending the data packet to the base station or the serving gateway through a channel of the data connection, or receiving a data packet that is sent by the base station or the serving gateway through a channel of the data connection, the method further comprises:
   receiving a second charging indication message sent by the home packet data network gateway, wherein the second charging indication message is used for instructing the transport packet data network gateway to charge for the data packet; and after sending the data packet to the base station or the serving gateway through a channel of the data connection, or receiving a data packet that is sent by the base station or the serving gateway through a channel of the data connection, the method further comprises:
performing data exchange with a charging center according to a charging policy, so as to complete charging for the data packet.

7. The method according to claim 1, wherein:
before sending the data packet to the base station or the serving gateway through a channel of the data connection, or after the receiving a data packet that is sent by the base station or the serving gateway through a channel of the data connection, the method further comprises:
receiving a first deep packet inspection (DPI) request message sent by the home packet data network gateway, wherein the first DPI request message is used for requesting the transport packet data network gateway to perform DPI inspection on the data packet, and
performing DPI inspection on the data packet according to the first DPI request message and a pre-configured DPI policy; or
before sending the data packet to the base station or the serving gateway through a channel of the data connection, or after the receiving a data packet that is sent by the base station or the serving gateway through a channel of the data connection, the method further comprises:
receiving a second DPI request message sent by the home packet data network gateway, wherein the second DPI request message is used for requesting the transport packet data network gateway to send the data packet that meets a condition to the home packet data network gateway for DPI inspection, and the second DPI request message further carries a condition for screening the data packet that meets a condition, and
sending the data packet that meets a condition to the home packet data network gateway according to the second DPI request message, so that the home packet data network gateway performs DPI inspection on the data packet according to a DPI policy, and sends an inspection result to the transport packet data network gateway when requested by the transport packet data network gateway; or
before sending the data packet to the base station or the serving gateway through a channel of the data connection, or after the receiving a data packet that is sent by the base station or the serving gateway through a channel of the data connection, the method further comprises:
receiving a third DPI request message sent by the home packet data network gateway, wherein the third DPI request message is used for instructing the transport packet data network gateway to send the data packet to an external DPI module for inspection, wherein the external DPI module is specified by the home packet data network gateway, and
sending the data packet to the external DPI module specified by the home packet data network gateway, so that the external DPI module specified by the home packet data network gateway performs DPI inspection on the data packet, and feeds back an inspection result to the transport packet data network gateway when requested by the transport packet data network gateway.

8. A transport packet data network gateway, comprising:
a receiver, a memory storing executable instructions, a processor coupled to the memory and configured to execute the executable instructions, and a sender;
wherein the receiver is configured to receive a data packet to be sent to a mobile node, and send the data packet to the processor, wherein the data packet carries internet protocol (IP) address information of the mobile node;
wherein the processor is configured to receive the data packet that is sent by the receiver and carries the IP address information of the mobile node, determine a home packet data network gateway of the mobile node according to the IP address information of the mobile node, and then send IP address information of the home packet data network gateway to the sender;
wherein the sender is configured to receive the IP address information of the home packet data network gateway of the mobile node that is sent by the processor, and send a data connection establishment request message to the home packet data network gateway determined by the processor, to request to establish a data connection to a base station or a serving gateway at a location of the mobile node, so that the transport packet data network gateway establishes the data connection to the base station or the serving gateway by using the home packet data network gateway, wherein the transport packet data network gateway stores information about all IP address segments in an entire mobile network that are used for being assigned to a mobile node, and the transport packet data network gateway notifies all nearby network nodes of the information about all IP address segments that are used for being assigned to a mobile node, so that a correspondent node can access the mobile network by using the transport packet data network gateway;
wherein the sender is further configured to send the data packet to the base station or the serving gateway through a channel of the data connection; and
wherein the receiver is further configured to receive a data packet that is sent by the base station or the serving gateway through a channel of the data connection.

9. The transport packet data network gateway according to claim 8, wherein the processor configured determine a home packet data network gateway of the mobile node according to the IP address information of the mobile node is further configured to:
query a specific network element according to the IP address information of the mobile node, so as to determine the home packet data network gateway of the mobile node; or
query a pre-configured mapping relationship between an IP address segment and the home packet data network gateway according to an IP address of the mobile node, so as to determine the home packet data network gateway of the mobile node.

10. The transport packet data network gateway according to claim 8, wherein sender configured to send a data connection establishment request message to the home packet data network gateway is further configured to:
send a dedicated bearer setup request message, to the home packet data network gateway, to request to set up a dedicated bearer to the base station or the serving gateway at the location of the mobile node, wherein the dedicated bearer setup request message carries an IP address of the transport packet data network gateway and a tunnel endpoint identifier (TEID) assigned by the transport packet data network gateway, so that the dedicated bearer is set up between the transport packet data network gateway and the serving gateway or the base station according to the IP address and the TEID.

11. The transport packet data network gateway according to claim 8, wherein the home packet data network gateway is a control plane network element of the home packet data network gateway.

12. The transport packet data network gateway according to claim 8, wherein:
the receiver is further configured to: before the data packet is sent to the base station or the serving gateway through the channel of the data connection, or the data packet that is sent by the base station or the serving gateway through the channel of the data connection is received, receive a first charging indication message sent by the home packet data network gateway, and send the first charging indication message to the sender, wherein the first charging indication message is used for requesting the transport packet data network gateway to send charging information of the data packet to the home packet data network gateway; and
the sender is further configured to: receive the first charging indication message sent by the receiver, and after the data packet is sent to the base station or the serving gateway through the channel of the data connection, or the data packet that is sent by the base station or the serving gateway through the channel of the data connection is received, send the charging information of the data packet to the home packet data network gateway, so that the home packet data network gateway performs data exchange with a charging center according to a charging policy, so as to complete charging for the data packet.

13. The transport packet data network gateway according to claim 8, wherein:
the receiver is further configured to: before the data packet is sent to the base station or the serving gateway through the channel of the data connection, or the data packet that is sent by the base station or the serving gateway through the channel of the data connection is received, receive a second charging indication message sent by the home packet data network gateway, and send the second charging indication message to the processor, wherein the second charging indication message is used for requesting the transport packet data network gateway to charge for the data packet; and
the processor is further configured to: after the data packet is sent to the base station or the serving gateway through the channel of the data connection, or the data packet that is sent by the base station or the serving gateway through the channel of the data connection is received, receive the second charging indication message sent by the receiver, and perform data exchange with a charging center according to a charging policy, so as to complete charging for the data packet.

14. The transport packet data network gateway claim 8, wherein:
the receiver is further configured to: before the data packet is sent to the base station or the serving gateway through the channel of the data connection, or after the data packet that is sent by the base station or the serving gateway through the channel of the data connection is received, receive a first deep packet inspection (DPI) request message sent by the home packet data network gateway, and send the first DPI request message to the processor, wherein the first DPI request message is used for requesting the transport packet data network gateway to perform DPI inspection on the data packet, and
the processor is further configured to receive the first DPI request message sent by the receiver, and perform DPI inspection on the data packet according to the first DPI request message and a pre-configured DPI policy; or
the receiver is further configured to: before the data packet is sent to the base station or the serving gateway through the channel of the data connection, or after the data packet that is sent by the base station or the serving gateway through the channel of the data connection is received, receive a second DPI request message sent by the home packet data network gateway, and send the second DPI request message to the sender, wherein the second DPI request message is used for requesting the transport packet data network gateway to send the data packet that meets a condition to the home packet data network gateway for DPI inspection, and the second DPI request message further carries a condition for screening the data packet that meets a condition, and
the sender is further configured to receive the second DPI request message sent by the receiver, and send the data packet that meets a condition to the home packet data network gateway according to the second DPI request message, so that the home packet data network gateway performs DPI inspection on the data packet according to a DPI policy, and sends an inspection result to the transport packet data network gateway when requested by the transport packet data network gateway; or
the receiver is further configured to: before the data packet is sent to the base station or the serving gateway through the channel of the data connection, or after the data packet that is sent by the base station or the serving gateway through the channel of the data connection is received, receive a third DPI request message sent by the home packet data network gateway, and send the third DPI request message to the sender, wherein the third DPI request message is used for instructing the transport packet data network gateway to send the data packet to an external DPI module for inspection, wherein the external DPI module is specified by the home packet data network gateway, and
the sender is further configured to: receive the third DPI request message sent by the receiver, and send, according to the third DPI request message, the data packet to the external DPI module specified by the home packet data network gateway, so that the external DPI module specified by the home packet data network gateway performs DPI inspection on the data packet, and sends an inspection result to the transport packet data network gateway when requested by the transport packet data network gateway.

15. A home packet data network gateway, comprising:
a receiver, a memory storing executable instructions, and a processor coupled to the memory and configured to execute the executable instructions;
wherein the receiver is configured to receive a data connection establishment request message sent by a transport packet data network gateway, and send the data connection establishment request message to the processor, wherein the data connection establishment request message requests to establish a data connection between the transport packet data network gateway and a base station or a serving gateway at a location of a mobile node, and the data connection request message is a message that is sent by the transport packet data network gateway to a home packet data network gateway of the mobile node after the transport packet data network gateway receives a data packet to be sent to the mobile node and determines the home packet data network gateway according to IP address information of the mobile node carried in the data packet; and wherein the processor is configured to receive the data connection establishment request message sent by the receiver, and establish the data connection between the transport packet data network gateway and the base station or the serving gateway, so that the transport packet data network gateway sends the data packet to the base station or the serving gateway through a channel of the data connection, or receives a data packet that is sent by the base station or the serving gateway through a channel of the data connection, and so that the base station sends the data packet to the mobile node or the serving gateway sends the data packet to the mobile node by using the base station, wherein the base station or the serving gateway stores information about an uplink path and a downlink path for communication performed through the data connection.

16. The home packet data network gateway according to claim 15, wherein:
the processor configured to establish the data connection between the transport packet data network gateway and the base station is further configured to:
send a first data connection establishment request message to the base station, to request the base station to establish the data connection to the transport packet data network gateway, and
receive a first data connection establishment response message sent by the base station, and sending the first data connection establishment response message to the transport packet data network gateway; or
the processor configured to establish the data connection between the transport packet data network gateway and the base station is further configured to:
send a second data connection establishment request message for requesting the base station to establish the data connection to the transport packet data network gateway, to the serving gateway, so that the serving gateway sends the second data connection establishment request message to the base station by using a mobility management entity,
receive a second data connection establishment response message that is sent by the base station by using the mobility management entity and the serving gateway, and
send the second data connection establishment response message to the transport packet data network gateway; or
the processor configured to establish the data connection between the transport packet data network gateway and the serving gateway is further configured to:
send a third data connection establishment request message to the serving gateway, to request the serving gateway to establish the data connection to the transport packet data network gateway, and
receive a third data connection establishment response message sent by the serving gateway, and sending the third data connection response message to the transport packet data network gateway.

17. The home packet data network gateway according to claim 15, wherein:
the data connection establishment request message is a dedicated bearer setup request message;
the dedicated bearer setup request message carries an IP address of the transport packet data network gateway and a tunnel endpoint identifier (TEID) assigned by the transport packet data network gateway; and
the processor configured to establish the data connection between the transport packet data network gateway and the base station is further configured to:
set up a first dedicated bearer between the transport packet data network gateway and the base station according to the IP address of the transport packet data network gateway and the assigned TEID; or
the processor configured to establish the data connection between the transport packet data network gateway and the serving gateway is further configured to:
set up a second dedicated bearer between the transport packet data network gateway and the serving gateway according to the IP address of the transport packet data network gateway and the assigned TEID.

18. The home packet data network gateway according to claim 15, wherein:
the home packet data network gateway further comprises a sender configured to: before the transport packet data network gateway sends the data packet to the base station or the serving gateway through the channel of the data connection or receives the data packet that is sent by the base station or the serving gateway through the channel of the data connection, send a first charging indication message to the transport packet data network gateway, wherein the first charging indication message is used for requesting the transport packet data network gateway to send charging information of the data packet to the home packet data network gateway;
the receiver is further configured to: after the transport packet data network gateway sends the data packet to the base station or the serving gateway through the channel of the data connection or receives the data packet that is sent by the base station or the serving gateway through the channel of the data connection, receive the charging information, sent by the transport packet data network gateway, of the data packet, and send the charging information of the data packet to the processor; and
the processor is further configured to receive the charging information, sent by the receiver, of the data packet, and perform exchange with a charging center according to the charging information and a charging policy, so as to complete charging for the data packet.

19. The home packet data network gateway according to claim 15, wherein the sender is further configured to: before the transport packet data network gateway sends the data packet to the base station or the serving gateway through the channel of the data connection or receives the data packet that is sent by the base station or the serving gateway through the channel of the data connection, send a second charging indication message to the transport packet data network gateway, wherein the second charging indication message is used for instructing the transport packet data network gateway to charge for the data packet, so that after sending the data packet to the base station or the serving gateway through the channel of the data connection, or receiving the data packet that is sent by the base station or the serving gateway through the channel of the data connection, the transport packet data network gateway performs data exchange with a charging center according to a charging policy, so as to complete charging for the data packet.

20. The home packet data network gateway according to claim 15, wherein:
the sender is further configured to: before the transport packet data network gateway sends the data packet to the base station or the serving gateway through the channel of the data connection, or after the transport packet data network gateway receives the data packet that is sent by the base station or the serving gateway through the channel of the data connection, send a first deep packet inspection (DPI) request message to the transport packet data network gateway, wherein the first DPI request message is used for requesting the transport packet data network gateway to perform DPI inspection on the data packet, so that the transport packet data network gateway performs DPI inspection on the data packet according to the first DPI request message and a pre-configured DPI policy; or the sender is further configured to: before the transport packet data network gateway sends the data packet to the base station or the serving gateway through the channel of the data connection, or after the transport packet data network gateway receives the data packet that is sent by the base station or the serving gateway through the channel of the data connection, send a second DPI request message to the transport packet data network gateway, wherein the second DPI request message is used for requesting the transport packet data network gateway to send the data packet that meets a condition to the receiver, and the second DPI request message further carries a condition for screening the data packet that meets a condition;

the receiver is further configured to: receive the data packet that is sent by the transport packet data network gateway and meets a condition, and send the data packet to the processor, and the processor is further configured to: receive the data packet sent by the receiver and perform, according to a DPI policy, DPI inspection on the data packet that meets a condition, and send an inspection result to the transport packet data network gateway by using the sender when requested by the transport packet data network gateway; or the sender is further configured to: before the transport packet data network gateway sends the data packet to the base station or the serving gateway through the channel of the data connection, or after the transport packet data network gateway receives the data packet that is sent by the base station or the serving gateway through the channel of the data connection, send a third DPI request message to the transport packet data network gateway, wherein the third DPI request message is used for instructing the transport packet data network gateway to send the data packet to an external DPI module for inspection, wherein the external DPI module is specified by the home packet data network gateway, so that the transport packet data network gateway sends the data packet to the external DPI module specified by the home packet data network gateway, and so that the external DPI module specified by the home packet data network gateway performs DPI inspection on the data packet, and sends an inspection result to the transport packet data network gateway when requested by the transport packet data network gateway.

* * * * *